(12) United States Patent
Baba et al.

(10) Patent No.: US 7,812,763 B2
(45) Date of Patent: Oct. 12, 2010

(54) TIME ADJUSTMENT DEVICE, TIMEPIECE WITH A TIME ADJUSTMENT DEVICE, AND A TIME ADJUSTMENT METHOD

(75) Inventors: Norimitsu Baba, Nagano-ken (JP); Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 12/234,369

(22) Filed: Sep. 19, 2008

(65) Prior Publication Data

US 2009/0079630 A1    Mar. 26, 2009

(30) Foreign Application Priority Data

Sep. 26, 2007    (JP)    ............... 2007-248928

(51) Int. Cl.
  *G01S 19/24*    (2010.01)
  *G01S 19/28*    (2010.01)
(52) U.S. Cl. ............... 342/357.67; 342/357.63
(58) Field of Classification Search ............ 342/357.06, 342/357.08, 357.13, 357.15; 701/213, 215
  See application file for complete search history.

(56) References Cited

U.S. PATENT DOCUMENTS

| | | | |
|---|---|---|---|
| 3,336,591 A | 8/1967 | Michnik et al. | |
| 7,388,812 B2 | 6/2008 | Nakamura | |
| 2002/0154681 A1* | 10/2002 | Kontola | 375/147 |
| 2006/0114151 A1 | 6/2006 | Iwami | |
| 2007/0201313 A1 | 8/2007 | Rudolph et al. | |
| 2007/0268180 A1* | 11/2007 | Zhi et al. | 342/357.12 |
| 2008/0074950 A1* | 3/2008 | Rostrom | 368/10 |

FOREIGN PATENT DOCUMENTS

| | | |
|---|---|---|
| CN | 86105364 A | 5/1987 |
| CN | 1705918 A | 12/2005 |
| EP | 1 083 440 A2 | 3/2001 |
| JP | 10-10251 | 1/1998 |
| JP | 2003-279676 | 10/2003 |
| JP | 2004-126967 | 4/2004 |
| JP | 2006-145411 | 6/2006 |
| WO | 87/01540 | 3/1987 |
| WO | 95/27927 | 10/1995 |
| WO | 99/44073 A1 | 9/1999 |
| WO | 01-75470 A1 | 10/2001 |

* cited by examiner

*Primary Examiner*—Dao L Phan

(57) ABSTRACT

A time adjustment device has a reception unit that receives a satellite signal transmitted from a positioning information satellite, a time information generating unit that generates internal time information, and a time information adjustment unit that adjusts the internal time information. The satellite signal contains satellite time information that is kept by the positioning information satellite. The reception unit includes a signal level acquisition unit that searches for positioning information satellites and acquires the signal level of the satellite signal transmitted from each positioning information satellite, a reception satellite selection unit that selects a positioning information satellite based on the acquired signal level, and a satellite time information acquisition unit that receives the satellite signal transmitted from the positioning information satellite selected by the reception satellite selection unit, and acquires the satellite time information contained in the satellite signal. The time information adjustment unit adjusts the internal time information based on the acquired satellite time information when the satellite time information acquisition unit has acquired the satellite time information.

9 Claims, 10 Drawing Sheets

TIME ADJUSTMENT DEVICE, TIMEPIECE WITH A TIME ADJUSTMENT DEVICE, AND A TIME ADJUSTMENT METHOD

CROSS-REFERENCE TO RELATED APPLICATIONS

Japanese Patent Application No. 2007-248928 is hereby incorporated by reference in its entirety.

BACKGROUND

1. Field of Invention

The present invention relates to a time adjustment device that corrects the time based on signals from a positioning information satellite such as a GPS satellite, to a timepiece that has the time adjustment device, and to a time adjustment method.

2. Description of Related Art

The Global Positioning System (GPS) for determining the position of a GPS receiver uses GPS satellites that circle the Earth on known orbits, and each GPS satellite has an atomic clock on board. Each GPS satellite therefore keeps the time (referred to below as the GPS time) with extremely high precision.

An electronic timepiece that adjusts the time using time information (GPS time) from GPS satellites is taught, for example, in Japanese Unexamined Patent Appl. Pub. JP-A-H10-10251.

In the electronic timepiece that uses the GPS time, the reception unit that receives the signals from the GPS satellites must receive the TOW signal (Time of Week, GPS time information that restarts every week and denotes the number of seconds from the beginning of the week) contained in the GPS satellite signals in order to get the time information from the GPS satellite.

In order to shorten the time needed from the start of signal reception until the correct time can be output, this electronic timepiece prioritizes the satellite search sequence based on the past reception history, selects a positioning information satellite, and adjusts the time without determining its own position.

By prioritizing the order of the satellites selected for reception based on the past reception history to get the time information, the electronic timepiece taught in Japanese Unexamined Patent Appl. Pub. JP-A-H10-10251 is effective in an electronic timepiece that is located indoors and has a limited angle of exposure to the sky through a window.

However, if the electronic timepiece is a wristwatch and is worn on the wrist as the user moves or walks around, selecting the satellite based on the past reception history is substantially meaningless because of the following conditions.

First, because the person wearing the timepiece moves around, the location of the timepiece changes and the timepiece may therefore not be able to receive signals from the satellite from which signals were successfully received in the past (such as when a user in Japan takes the timepiece overseas).

Second, because the person wearing the timepiece moves around, the reception environment is not always the same (because signals may be blocked by homes, buildings, trees, or other objects).

Third, when the user walks around with the timepiece worn on the wrist, the orientation of the antenna is not constant and the positioning information satellites that are suitable for actual reception change even if the satellite signals are received at the same time of day.

Reliably receiving the satellite signals can therefore be difficult, and setting the correct time based on the acquired time information can be difficult, even if the technology taught in Japanese Unexamined Patent Appl. Pub. JP-A-H10-10251 is used in a wristwatch.

SUMMARY OF INVENTION

A time adjustment device, a timepiece device with the time adjustment device, and a time adjustment method according to preferred aspects of the present invention enable reliably receiving the satellite signals and acquiring the time information even if the user is travelling around with the time adjustment device worn on the wrist.

A time adjustment device according to a first aspect of the invention has a reception unit that receives a satellite signal transmitted from a positioning information satellite; a time information generating unit that generates internal time information; and a time information adjustment unit that adjusts the internal time information. The satellite signal contains satellite time information that is kept by the positioning information satellite. The reception unit includes a signal level acquisition unit that searches for positioning information satellites and acquires the signal level of the satellite signal transmitted from each positioning information satellite, a reception satellite selection unit that selects a positioning information satellite based on the acquired signal level, and a satellite time information acquisition unit that receives the satellite signal transmitted from the positioning information satellite selected by the reception satellite selection unit, and acquires the satellite time information contained in the satellite signal. The time information adjustment unit adjusts the internal time information based on the acquired satellite time information when the satellite time information acquisition unit has acquired the satellite time information.

The signal level acquisition unit in the time adjustment device according to this aspect of the invention searches for positioning information satellites, determines what satellites are present, and acquires the signal level of the satellite signal transmitted from each positioning information satellite. The SNR (signal to noise ratio) of the satellite signal transmitted from each positioning information satellite is preferably acquired as the signal level. Because the signal level can be acquired in a short time, the processing time is short even if the signal level is acquired from a plurality of satellites, and power consumption can therefore be reduced.

The signal level can therefore be acquired and confirmed each time the time information is acquired, and the reception satellite selection unit can select a satellite suitable for reception even while the time adjustment device is worn on the wrist as the user moves around and the positioning information satellite suitable for reception changes. The satellite time information acquisition unit can therefore reliably acquire the satellite time information, and the time information adjustment unit can adjust the internal time information based on the received satellite time information. The accuracy of the time kept by the time adjustment device can therefore be improved because the time information adjustment unit can adjust the internal time information based on the high precision time information of the satellite signal.

The GPS satellites that are already deployed can be used as the positioning information satellites, but other positioning information satellites that may become usable in the future can also be used.

In a time adjustment device according to another aspect of the invention the signal level acquisition unit interrupts the signal level acquisition process when a positioning information satellite for which the signal level of the satellite signal is greater than or equal to a predetermined level is detected while sequentially searching for a positioning information satellite, and the reception satellite selection unit selects the positioning information satellite detected the signal level acquisition unit.

This aspect of the invention can shorten the positioning information satellite detection process because the search process is interrupted when a positioning information satellite for which the signal level of the satellite signal is greater than or equal to a predetermined level is detected during the satellite search. The time from when the positioning information satellite search starts until the satellite time information is acquired and the time is adjusted can therefore be shortened, and power can be saved.

The predetermined level used in this aspect of the invention can be the same as the level used for determining which positioning information satellites to select, or it can be a higher level. This predetermined level is preferably a level that enables reliably acquiring the satellite time information, and can be determined by a reception test, for example.

Further preferably, the signal level acquisition unit resumes the interrupted signal level acquisition process from the next positioning information satellite scheduled for searching if the satellite time information acquisition unit cannot acquire the satellite time information.

If the search is interrupted because a satellite signal of the predetermined level is detected but the satellite time information cannot be acquired from the signal of the detected satellite, this aspect of the invention enables resuming the search from the next positioning information satellite scheduled for reception. It is therefore not necessary to receive and detect the signal level again for satellites with a previously detected low signal level, and the next positioning information satellite to be selected can be efficiently detected.

The signal level acquisition unit could also repeat the positioning information satellite search from the beginning if the satellite time information acquisition unit cannot acquire the satellite time information.

If the search is interrupted because a satellite signal of the predetermined level is detected but the satellite time information cannot be acquired from the signal of the detected satellite, a positioning information satellite from which there is a strong possibility that the satellite time information can be received can be reliably detected if the positioning information satellite search starts from the beginning again.

In the time adjustment device according to another aspect of the invention the reception unit has a plurality of reception channels for receiving satellite signal; the signal level acquisition unit assigns the detected positioning information satellite to a reception channel and continues the positioning information satellite search when a positioning information satellite for which the signal level of the satellite signal is greater than or equal to a first level is detected while sequentially searching for a positioning information satellite, and interrupts the signal level acquisition process when a positioning information satellite has been assigned to all of the reception channels, or when a positioning information satellite with a signal level greater than or equal to a second level that is higher than the first level is detected before positioning information satellites are assigned to all reception channels; and the satellite time information acquisition unit receives a satellite signal on each channel to which a positioning information satellite is assigned and acquires the satellite time information contained in each satellite signal.

This first level is a level that enables determining if the satellite signal was received from a positioning information satellite from which signals can be received at the present time, or if the positioning information satellite is on the other side of the Earth and signals cannot be received.

The second level is set higher than the first level, and is set to a high level at which the possibility of being able to acquire the satellite time information is high if a satellite signal with a signal level greater than or equal to the second level is received.

If a satellite signal with a signal level greater than or equal to the second level is detected by this aspect of the invention, the positioning information satellite search is immediately interrupted and the satellite time information is acquired. The satellite search process can therefore be completed in a short time, the time until the satellite time information is acquired is short, and power can be saved.

Furthermore, if a satellite signal with a signal level greater than or equal to the second level cannot be detected, the satellite time information can be acquired from plural satellites because positioning information satellites transmitting satellite signals with a signal level greater than or equal to the first level are assigned to plural reception channels. The plural satellite time values can then be compared and whether the satellite time information is valid can be verified.

In a time adjustment device according to another aspect of the invention the reception unit has a storage unit for storing the positioning information satellite and signal level detected by the signal level acquisition unit; and the signal level acquisition unit searches for satellite signals in order from the highest signal level stored in the storage unit when the signal level acquisition process is executed within a predetermined time after the signal levels of the satellite signals were last acquired and stored in the storage unit.

When the time adjustment device is used in a timepiece such as a wristwatch that is worn on the wrist and the reception process runs while the user is walking around, for example, it may be not possible to acquire the satellite time information even though a signal of the desired signal level was acquired because the satellite is temporarily hidden by a building.

In such cases the reception process may run again either automatically after a certain period of time (such as approximately 0.5 to 3 hours later) or when manually started by the user.

If the signal levels are stored in the signal level acquisition process of the signal level acquisition unit, that is, during the positioning information satellite search process, and the search for a positioning information satellite occurs again after this prescribed time has passed, the likelihood is high that the search time can be shortened by searching in order from the highest signal strength (signal level) stored during the last reception process because there is a strong possibility that the positioning information satellite with a high signal level last time can be detected again.

A positioning information satellite with a signal level greater than or equal to the predetermined level can therefore be quickly detected, processing time can be shortened, and power can be saved.

In another aspect of the invention the reception satellite selection unit selects the positioning information satellite from which the highest signal level was detected by the signal level acquisition unit; and the signal level acquisition unit repeats the positioning information satellite search from the beginning if the satellite time information acquisition unit cannot acquire the satellite time information.

If the satellite time information cannot be acquired even though the positioning information satellite with the highest signal level is selected, such as when the person wearing the time adjustment device moves to a different location, the satellite reception environment of the time adjustment device has probably changed. Therefore, if the signal level acquisition unit repeats the positioning information satellite search from the beginning, the satellite with the strongest signal at that time can be found again, and the possibility of being able to acquire the satellite time information can be improved.

In a time adjustment device according to another aspect of the invention the reception satellite selection unit sets the positioning information satellite selection sequence in order from the highest signal level detected by the signal level acquisition unit, and selects the positioning information satellites in the set order when the satellite time information acquisition unit cannot acquire the satellite time information.

If the satellite time information cannot be acquired even though the positioning information satellite with the highest signal level is selected, such as when the person wearing the time adjustment device moves to a different location, the satellite reception environment of the time adjustment device has probably changed as a result of a building hiding the positioning information satellite from the time adjustment device.

Therefore, if the positioning information satellite with the next highest signal level is selected for the satellite time information acquisition unit to acquire the satellite time information, the possibility of being able to acquire the satellite time information can be improved, the processing time can be shortened and power can be saved because it is not necessary to repeat the satellite search.

In a time adjustment device according to another aspect of the invention the reception unit has a plurality of reception channels for receiving satellite signal; the reception satellite selection unit selects the positioning information satellites in order from the highest signal level detected by the signal level acquisition; and the satellite time information acquisition unit assigns the selected positioning information satellites to the reception channels in order from the highest signal level, receives a satellite signal on each channel, and acquires the satellite time information contained in each satellite signal.

If a plurality of reception channels is available, satellite signals can be received simultaneously from a plurality of positioning information satellites. Because the satellite time information can therefore be received simultaneously from plural satellites, the acquired plural satellite time values can be compared with each other and whether the satellite time information is valid can be verified.

Furthermore, because the satellites are assigned in order from the highest signal level when the positioning information satellites are assigned to the plural reception channels, the possibility of being able to receive the satellite time information on each channel can be improved.

Therefore, the likelihood of being able to acquire accurate satellite time information is high, and the internal time information can be adjusted to the correct time.

In this aspect of the invention the reception satellite selection unit preferably includes for selection only positioning information satellites for which the signal level detected by the signal level acquisition unit is greater than or equal to a predetermined level.

This predetermined level is any level at which the possibility of being able to acquire the satellite time information is high, and can be set based on reception tests.

If the reception satellite selection unit selects only the positioning information satellites with a signal level greater than or equal to a predetermined level, positioning information satellites with a lower signal level will not be selected. Attempting to receive a satellite signal from which the possibility of being able to acquire the satellite time information is low can thus be prevented, and the satellite time information can be efficiently acquired.

In a time adjustment device according to another aspect of the invention the satellite time information acquisition unit receives satellite time information on each channel to which a positioning information satellite is assigned, compares the received satellite time information, and determines if the received satellite time information is correct; and the time information adjustment unit adjusts the internal time information based on the acquired satellite time information if the satellite time information acquisition unit determines that the time information is correct.

This aspect of the invention can improve the accuracy of the received satellite time information because the acquired plural satellite time values can be compared with each other and whether the satellite time information is correct can be determined. The internal time information can therefore be reliably adjusted to the correct time.

In a time adjustment device according to another aspect of the invention the satellite time information acquisition unit determines that the satellite time information cannot be acquired if the satellite time information could not be acquired within a predetermined time from the start of receiving the satellite signal from the selected positioning information satellite.

If a condition in which the satellite time information cannot be received continues for a predetermined time or longer, this aspect of the invention enables executing a process to detect the next positioning information satellite, for example, thereby prevents needlessly continuing reception, and thus reduces power consumption.

This predetermined time is set to a time that enables determining if the satellite time information has been acquired based on, for example, the signal format of the satellite signal.

For example, GPS satellites, which can be used as the positioning information satellite, transmit the satellite time information every 6 seconds, and the satellite time information can normally be received within 6-12 seconds including time for the signal synchronization process. Therefore, if the satellite time information cannot be received even though 12 or more seconds have passed the likelihood of being able to receive the information is low even if reception continues. As a result, if it is determined that the time information from a particular positioning information satellite cannot be received when the satellite time information has not been received within 12 seconds, wasted attempts at reception can be kept to a minimum and power consumption can be reduced.

A timepiece with a time adjustment device according to another aspect of the invention has a reception unit that receives a satellite signal transmitted from a positioning information satellite; a time information generating unit that generates internal time information; a time information adjustment unit that adjusts the internal time information; and a time display unit that displays the internal time information. The satellite signal contains satellite time information that is kept by the positioning information satellite. The reception unit includes a signal level acquisition unit that searches for positioning information satellites and acquires the signal level of the satellite signal transmitted from each positioning information satellite, a reception satellite selection unit that selects a positioning information satellite based on the acquired signal level, and a satellite time information acquisition unit that receives the satellite signal transmitted from the positioning information satellite selected by the reception satellite selection unit, and acquires the satellite time information contained in the satellite signal. The time information adjustment unit adjusts the internal time information based on the acquired satellite time information when the satellite time information acquisition unit has acquired the satellite time information.

As with the time adjustment device described above, the timepiece with a time adjustment device according to this aspect of the invention can acquire and confirm the signal level each time the time information is acquired, and the satellite best suited for reception can be selected even while the timepiece is worn on the wrist as the user moves around. The satellite time information acquisition unit can therefore reliably acquire the satellite time information, and the time information adjustment unit can adjust the internal time information based on the received satellite time information. The accuracy of the time kept by the timepiece can therefore be improved because the time information adjustment unit can adjust the internal time information based on the high precision time information of the satellite signal. The invention is thus suitable for a portable timepiece device, particularly timepieces such as wristwatches and pocket watches.

The time adjustment method according to another aspect of the invention includes a time information generating step that generates internal time information; a signal level acquisition step that sequentially searches for positioning information satellites and sequentially acquires the signal level of the satellite signal transmitted from each positioning information satellite; a reception satellite selection step that selects a positioning information satellite based on the acquired signal level; a satellite time information acquisition step that receives the satellite signal transmitted from the positioning information satellite selected by the reception satellite selection step, and acquires the satellite time information that is contained in the satellite signal and kept by the positioning information satellite; and a time information adjustment step that adjusts the internal time information based on the acquired satellite time information when the satellite time information acquisition step acquires the satellite time information.

As with the time adjustment device described above, the time adjustment method according to this aspect of the invention can acquire and confirm the signal level each time the time information is acquired, and the satellite best suited for reception can be selected even while the timepiece is worn on the wrist as the user moves around. The satellite time information acquisition unit can therefore reliably acquire the satellite time information, and the time information adjustment unit can adjust the internal time information based on the received satellite time information. The accuracy of the time kept by the time adjustment device can therefore be improved because the time information adjustment unit can adjust the internal time information based on the high precision time information of the satellite signal.

Further preferably, the signal level acquisition step interrupts the signal level acquisition process when a positioning information satellite for which the signal level of the satellite signal is greater than or equal to a predetermined level is detected in the step of sequentially searching for a positioning information satellite; and the reception satellite selection step selects the positioning information satellite detected the signal level acquisition step.

This aspect of the invention can shorten the positioning information satellite detection process because the search process is interrupted when a positioning information satellite for which the signal level of the satellite signal is greater than or equal to a predetermined level is detected during the satellite search. The time from when the positioning information satellite search starts until the satellite time information is acquired and the time is adjusted can therefore be shortened, and power can be saved.

DESCRIPTION OF THE PREFERRED EMBODIMENTS

Preferred embodiments of the present invention are described below with reference to the accompanying figures.

The embodiments described below are specific preferred embodiments of the present invention and certain technically preferred limitations are therefore also described, but the scope of the present invention is not limited to these embodiments or limitations unless specifically stated below.

Embodiment 1

Figure 1:
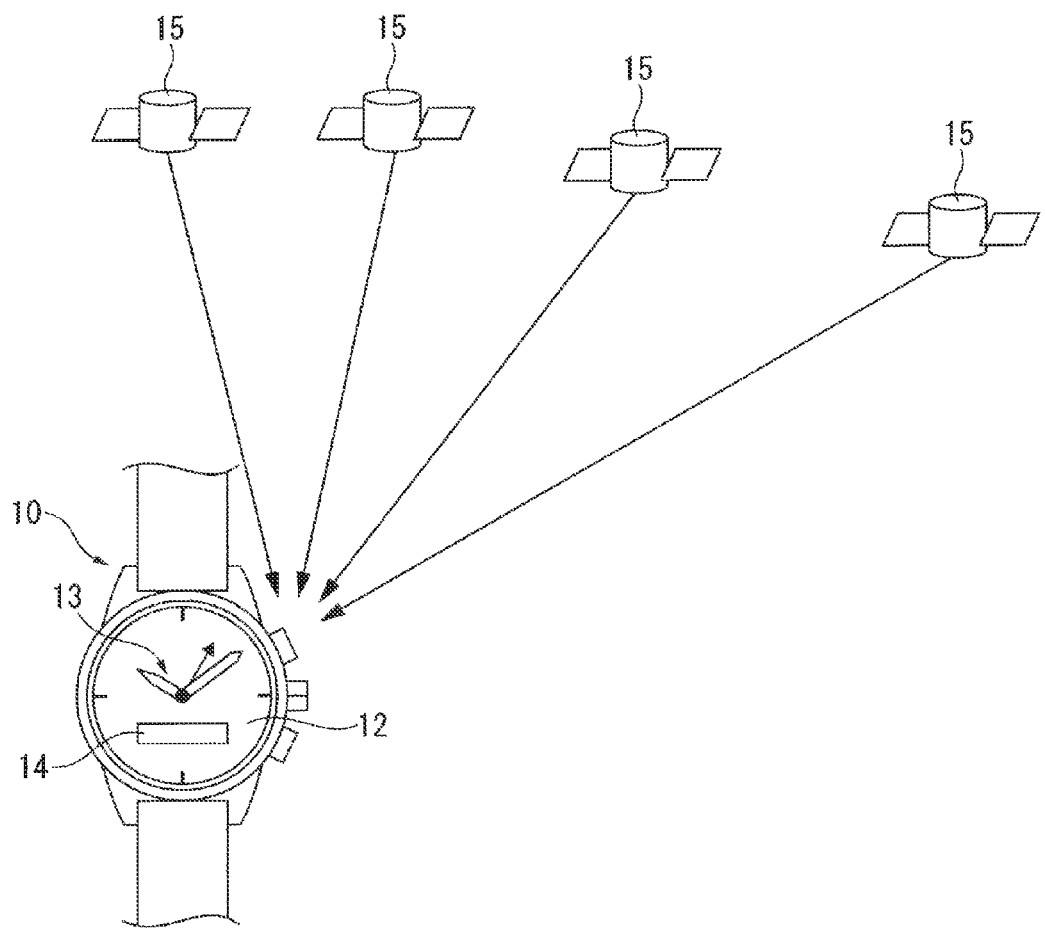
FIG. 1 is a schematic diagram showing a wristwatch with a GPS time adjustment device as an example of a timepiece with a time adjustment device according to the present invention.
Figure 2:
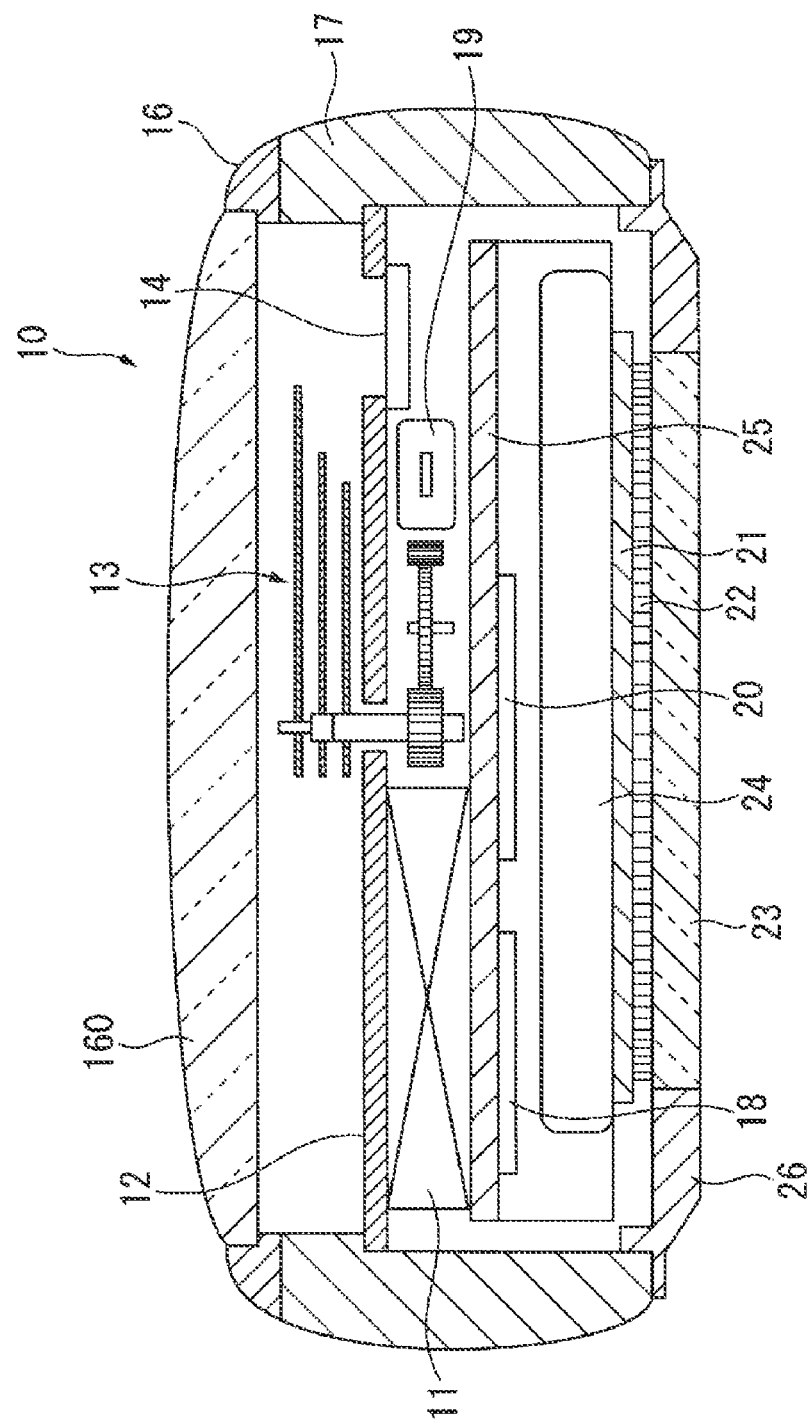
FIG. 2 is a schematic section view of the wristwatch with a GPS time adjustment device shown in FIG. 1.
Figure 3:
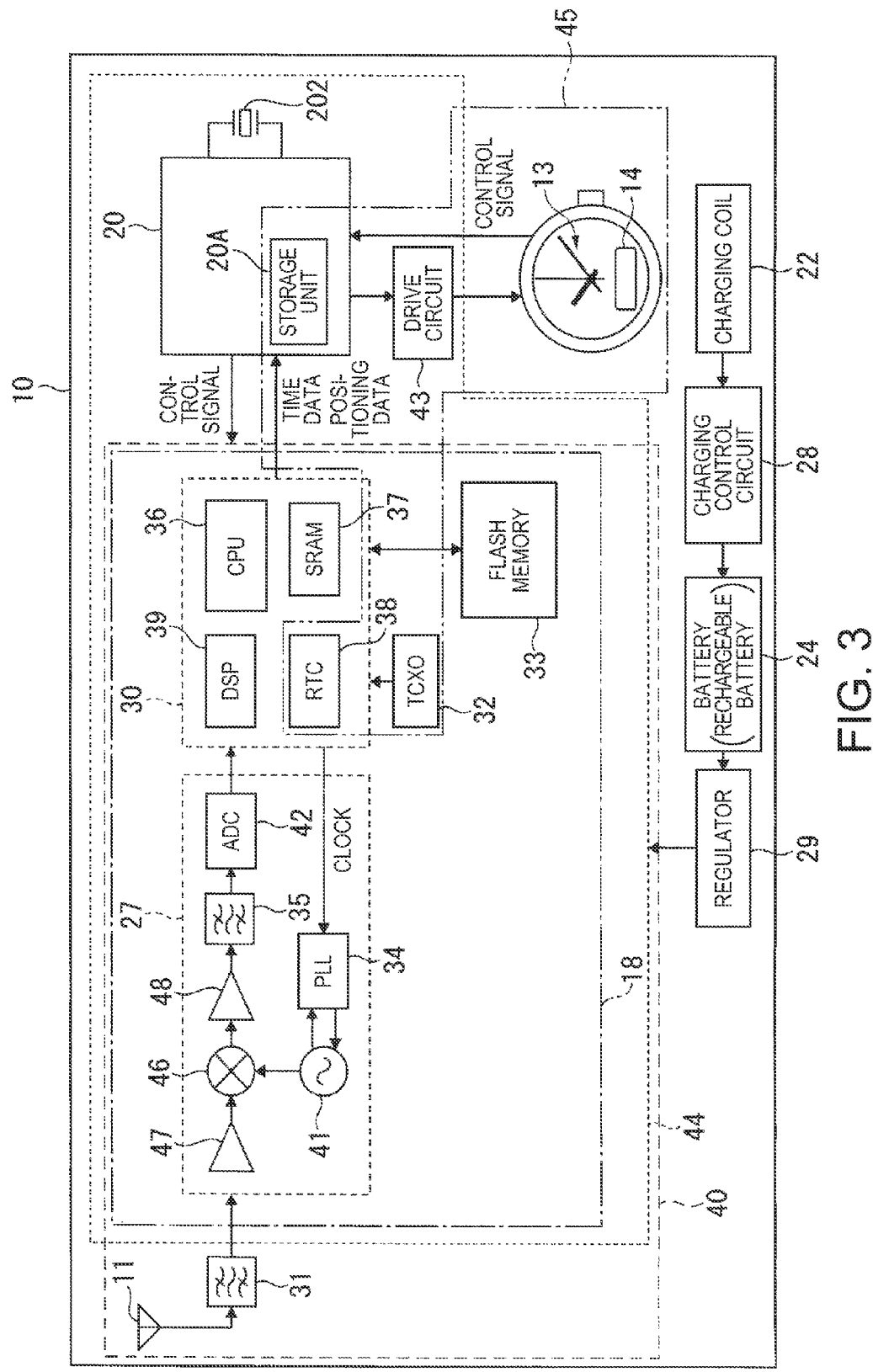
FIG. 3 is a block diagram showing the main internal hardware configuration of the wristwatch with a GPS time adjustment device shown in FIG. 1 and FIG. 2.

FIG. 1 is a schematic diagram showing a wristwatch with a GPS time adjustment device 10 (referred to below as a GPS wristwatch 10) as an example of a timepiece with a time adjustment device according to the present invention. FIG. 2 is a section view of the GPS wristwatch 10 shown in FIG. 1. FIG. 3 is a block diagram showing the main internal hardware configuration of the GPS wristwatch 10 shown in FIG. 1 and FIG. 2.

As shown in FIG. 1, the GPS wristwatch 10 has a time display unit including a dial 12 and hands 13. A window is formed in a part of the dial 12, and a display 14 such as an LCD panel is located in this window.

The hands 13 include a second hand, minute hand, and hour hand, and are driven through a wheel train by unit of a stepping motor described below.

The display 14 is typically a LCD unit and is used for displaying the latitude and longitude, city name, or other location information, as well as messages.

The GPS wristwatch 10 receives satellite signals from a plurality of GPS satellites 15 orbiting the Earth on fixed orbits in space, acquires satellite time information, and adjusts the internally kept time based on the satellite time information.

The GPS satellite 15 is an example of a positioning information satellite in the invention, and a plurality of GPS satellites 15 are orbiting the Earth in space. At present there are approximately 30 GPS satellites 15 in orbit.

* Internal Configuration of the GPS Wristwatch 10

The internal configuration of the GPS wristwatch 10 is described next.

As shown in FIG. 2, the GPS wristwatch 10 has an outside case 17 that is made of stainless steel, titanium, or other metal.

The outside case 17 is basically cylindrically shaped, and a crystal 160 is attached to the opening on the face side of the outside case 17 by an intervening bezel 16. A back cover 26 is attached to the opening on the back side of the outside case 17. The back cover 26 is annular and made of metal, and a back glass unit 23 is attached to the opening in the center.

Inside the outside case 17 are disposed a stepping motor for driving the hands 13, a GPS antenna 11, and a battery 24.

The stepping motor is a device that is commonly used in timepieces, and has a motor coil 19 and a stator and rotor not shown. The stepping motor drives the hands 13 by unit of an intervening wheel train.

This GPS antenna 11 is a patch antenna for receiving satellite signals from a plurality of GPS satellites 15 orbiting the Earth on fixed orbits in space. The GPS antenna 11 is located on the opposite side of the dial 12 as the side on which the time is displayed, and receives RF signals through the crystal 160 and the dial 12.

The dial 12 and crystal 160 are therefore made from materials that pass RF signals, particularly the satellite signals transmitted from the GPS satellites. The dial 12, for example is plastic. The bezel 16 is ceramic in order to improve satellite signal reception.

A circuit board 25 is disposed on the back cover side of the GPS antenna 11, and a battery 24 is disposed on the back cover side of the circuit board 25.

The circuit board 25 is also populated with various circuit devices (such as IC devices) including a reception circuit 18 that processes signals received by the GPS antenna 11 as described below, and a control unit 20 that controls, for example, the stepping motor that drives the hands 13. The reception circuit 18 and the control unit 20 operate using power supplied from the battery 24.

The battery 24 is a lithium-ion battery or other type of storage battery. A magnetic sheet 21 is disposed below (on the back cover side of) the battery 24, and a charging coil 22 is disposed with the magnetic sheet 21 between it and the battery 24. The battery 24 can therefore be charged by the charging coil 22 by unit of electromagnetic induction from an external charger. The magnetic sheet 21 can also divert the magnetic field. The magnetic sheet 21 therefore reduces the effect of the battery 24 and enables the efficient transmission of energy. The back glass unit 23 is disposed in the center part of the back cover 26 to facilitate power transmission.

The GPS wristwatch 10 is arranged as described above.

* Circuit Design of the GPS Wristwatch 10

The circuit design of the GPS wristwatch 10 is described next.

As shown in FIG. 3, the GPS wristwatch 10 also has a time display device 45, a GPS device 40, and a time adjustment device 44, and functions as a computer. As shown in FIG. 3, the time display device 45, the GPS device 40, and the time adjustment device 44 share some parts.

The arrangement shown in FIG. 3 is further described below.

* GPS Device

As shown in FIG. 3, the GPS wristwatch 10 has a GPS device 40 that receives and processes satellite signals received from a GPS satellite 15.

The GPS device 40 includes the GPS antenna 11, a filter (SAW) 31, and the reception circuit 18. The filter (SAW) 31 is a bandpass filter and in this embodiment of the invention extracts a 1.5-GHz satellite signal. The GPS device 40 thus renders the reception unit of the present invention.

The reception circuit 18 processes the satellite signal extracted by the filter, and includes an RF (radio frequency) unit 27 and baseband unit 30.

The RF unit 27 includes a PLL 34, IF filter 35, VCO (voltage controlled oscillator) 41, A/D converter 42, mixer 46, low noise amplifier 47, and IF amplifier 48.

The extracted satellite signal is amplified by the low noise amplifier 47, mixed by the mixer 46 with the signal from the VCO 41, and down-converted to an IF (intermediate frequency) signal.

The If signal mixed by the mixer 46 passes the IF amplifier 48 and IF filter 35, and is converted to a digital signal by the A/D converter 42.

The baseband unit 30 also includes a digital signal processor (DSP) 39, a CPU (central processing unit) 36, SRAM (static random access memory) 37, and a real-time clock (RTC) 38. A temperature-compensated crystal oscillator (TCXO) 32 and flash memory 33 are also connected to the baseband unit 30.

The baseband unit 30 then processes the digital signal input from the A/D converter 42 of the RF unit 27 based on a control signal, and processes the satellite signal to acquire the satellite time information and positioning information.

The clock signal of the PLL 34 is generated by the TCXO 32.

The real-time clock 38 functions as the time information generating unit that generates the internal time information of the invention. The real-time clock 38 counts up at the reference clock output from the TCXO 32.

* Time Adjustment Device

The time adjustment device 44 includes the reception circuit 18, the control unit 20, and a drive circuit 43. This time adjustment device 44 renders the time information correction unit of the invention.

The control unit 20 includes a storage unit 20A, and controls driving the GPS device 40, the hands 13, and the display 14. More specifically, the control unit 20 sends a control signal to the reception circuit 18, and controls the reception operation of the GPS device 40.

The storage unit 20A stores the time data (satellite time information) and the positioning data acquired by the baseband unit 30 of the reception circuit 18.

* Time Display Device

The time display device 45 includes the control unit 20, the real-time clock 38, the TCXO 32, the storage unit 20A, the drive circuit 43, the hands 13, and the display 14.

The internal time information generated by the real-time clock 38 is stored as the current time by the storage unit 20A, and the control unit 20 controls the time displayed by the hands 13 and display 14 based on the time data stored in the storage unit 20A.

When the satellite time information acquired by the baseband unit 30 is stored in the storage unit 20A and the internal time information is updated, the control unit 20 displays the corrected time on the display 14 by unit of the drive circuit 43.

The control unit 20 also calculates the difference between the current time indicated by the hands 13 and the corrected internal time information, drives the stepping motor to move the hands 13 an amount equal to this time difference, and thus controls the hands 13 to display the adjusted time.

The GPS wristwatch 10 according to this embodiment of the invention is driven by power supplied from a rechargeable battery 24.

More specifically, the charging coil 22 charges the battery 24 by unit of the charging control circuit 28. The battery 24 supplies drive power to the time adjustment device 44 and other components through the regulator 29.

As described above, the timekeeping mechanism according to this embodiment of the invention is thus an electronic timepiece.

* System Configuration of the GPS Device (Reception Unit) 40

Figure 4:
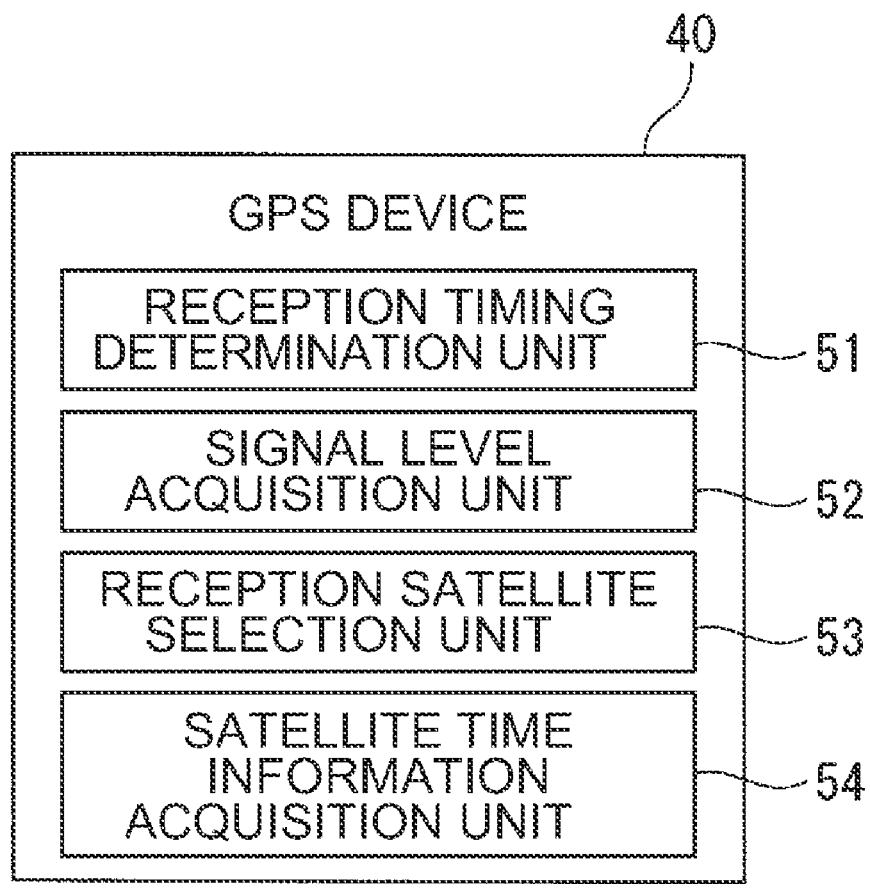
FIG. 4 is a schematic diagram showing the main software configuration of the wristwatch with a GPS time adjustment device shown in FIG. 1 and FIG. 2.

The system configuration of the GPS device 40 described as the reception unit of the invention is described next with reference to FIG. 4. FIG. 4 shows the function blocks rendered by a program run mainly by the CPU 36.

As shown in FIG. 4, the GPS device 40 has a reception timing determination unit 51, a signal level acquisition unit 52, a reception satellite selection unit 53, and a satellite time information acquisition unit 54.

* Time Adjustment Process

Figure 5:
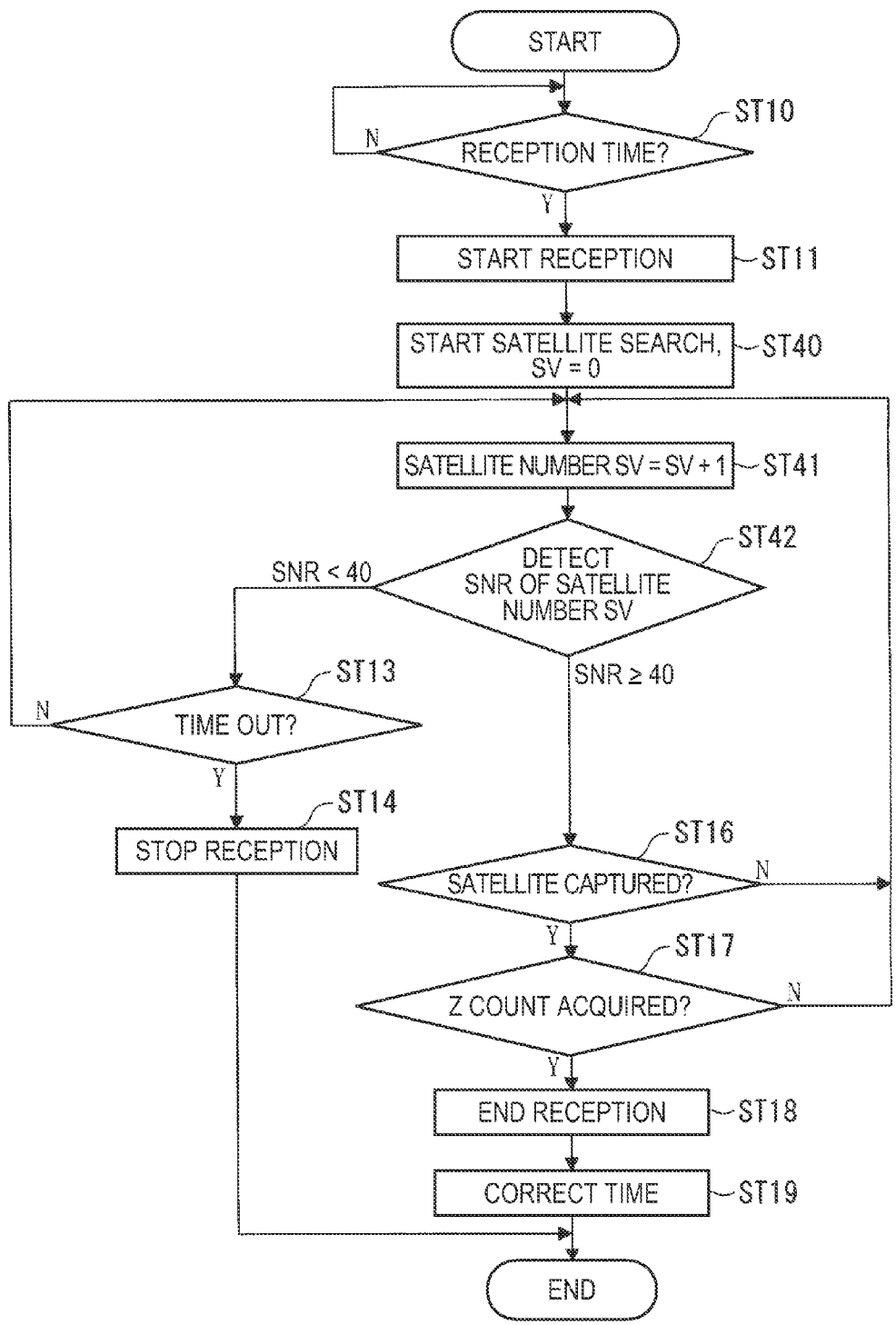
FIG. 5 is a flow chart showing the time adjustment operation of the first embodiment of the invention.

The operation of the GPS wristwatch 10 is described next with reference to the flow chart in FIG. 5.

In this first embodiment of the invention, searching for a satellite stops and the satellite capture determination step and Z count acquisition determination step run if a GPS satellite 15 with a signal level (SNR) greater than or equal to a prescribed level is detected while searching for a GPS satellite 15.

The GPS wristwatch 10 can select an automatic adjustment mode or a no-adjustment mode based on a control signal from the control unit 20. In the automatic adjustment mode the satellite signal from a GPS satellite 15 is automatically received at a regular interval and the time is adjusted. The time is not adjusted automatically in the no-adjustment mode. These modes can be selected by manually operating the crown or a button disposed to the GPS wristwatch 10.

The GPS wristwatch 10 can also execute an unconditional adjustment mode in which receiving the satellite signal and adjusting the time is forced by operating the crown or a button. This unconditional adjustment mode is identical to the automatic adjustment mode except that the reception time determination step ST10 shown in the flow chart in FIG. 5 is not executed, and further description thereof is thus omitted.

When the automatic adjustment mode is set, the reception timing determination unit 51 of the GPS wristwatch 10 determines if the reception time has come, or more specifically if it is time to receive the satellite time information and adjust the time (ST10).

More specifically, the reception timing determination unit 51 detects the time output by the real-time clock 38 (the time information generating unit) and determines if this time equals the preset reception time.

The reception time is set referenced to a time such as described below. If the GPS wristwatch 10 is accurate to a maximum of approximately 0.5 second per day, the number of times per day that the satellite signal is received from the GPS satellite 15 to correct the time can be limited to 2 or 3 times per day. The GPS wristwatch 10 therefore preferably receives the satellite signal when it is in a good environment for receiving satellite signals from a GPS satellite 15. The reception time is therefore set to a time when the GPS wristwatch 10 is likely to be in an environment where reception is good.

The reception time is therefore set to a time such as 2:00 or 3:00 a.m., or 7:00 or 8:00 a.m.

Setting the reception time to 2:00 or 3:00 a.m. is effective because the likelihood is high that the GPS wristwatch 10 is not being used by the user and is removed from the wrist and left stationary indoors, electrical appliance use is minimal, and the signal reception environment is best.

Setting the reception time to 7:00 or 8:00 a.m. is also effective because this is the typical time for commuting to work or school, and the likelihood is high that the user is wearing the GPS wristwatch 10 and the GPS wristwatch 10 will be outdoors sometime during this period. More particularly, even if the user is inside a building or factory where satellite signal reception is poor while at work, the user is likely outdoors while commuting, and the likelihood is therefore greater that the signal reception environment is good and the satellite signal can be received.

If the reception time has come in ST10, the signal level acquisition unit 52 of the GPS wristwatch 10 executes a signal level acquisition step.

More specifically, the signal level acquisition unit 52 starts the GPS device 40 and executes the start reception step ST11 to start receiving the satellite signal sent from a GPS satellite 15. Yet more specifically, the GPS device 40 generates the C/A code pattern described below of the GPS satellite 15 to be received in order to receive the GPS signal as the satellite signal from the GPS antenna 11, and starts receiving.

The signal level acquisition unit 52 then runs a satellite search step to detect the signal level. In the satellite search step the signal level acquisition unit 52 initializes the satellite number SV to 0 (ST40), and then adds 1 to the satellite number SV (ST41).

The signal level acquisition unit 52 then searches for the GPS satellite 15 identified by the satellite number SV, and detects the signal level (SNR) (ST42). More specifically, the signal level acquisition unit 52 adjusts the output timing of the C/A code of the GPS satellite 15 and searches for a GPS satellite 15 with which it can synchronize.

Satellite signals from all of the GPS satellites 15 are transmitted on the same frequency, but are transmitted using code division multiple access (CDMA) by using a different C/A code for each GPS satellite 15. The GPS satellites 15 that can currently be captured can therefore be searched for by reading the C/A code contained in the received satellite signal.

The signal level acquisition unit 52 therefore adjusts the output timing of the C/A code pattern of each GPS satellite 15 to search for a GPS satellite 15 with which it can synchronize. That is, by detecting the correlation between the received satellite signal and the C/A code generated by the signal level acquisition unit 52, the output will have an output peak at a predetermined time if the C/A codes are the same, but the output will not have a peak and be substantially flat at zero if the C/A codes differ.

The signal level of the satellite signal can also be acquired by determining the SNR of the synchronized satellite signal.

The signal level acquisition unit 52 then stores information (such as the satellite number SV) about the GPS satellite 15 located by searching and the signal level of the detected satellite in SRAM 37 or other storage unit.

Note that the code length of the C/A code is 1 ms, and a search for all approximately 30 GPS satellites 15 can be conducted in approximately 2 seconds by adjusting the C/A code output time while searching.

If the detected signal level is less than a predetermined level, and more specifically has an SNR of less than 40, the signal level acquisition unit 52 determines if the search has timed out by determining if the time passed since the start of the satellite search exceeds a predetermined time (such as 6 seconds) (ST13).

More specifically, if a satellite can be detected, the GPS satellite 15 search process should be completed within a maximum 2 seconds. Therefore, if synchronization with a GPS satellite 15 is not possible even though a specific time, such as 6 seconds, has passed since the satellite search step ST12 started, the signal level acquisition unit 52 determines that operation has timed out.

If operation has not timed out in ST13, the signal level acquisition unit 52 returns to step ST41 and adds 1 to the satellite number SV, and then detects the signal level of the GPS satellite 15 identified by the new satellite number SV (ST42).

As a result, if the signal level acquisition unit 52 in this embodiment of the invention finds a GPS satellite 15 with a signal level (SNR) of 40 or more, the satellite search ends. If a GPS satellite 15 with an SNR greater than or equal to 40 is not found, the signal level acquisition unit 52 sequentially checks the signal level of each GPS satellite 15 starting from the GPS satellite 15 identified by satellite number SV=1 until operation times out.

The satellite number SV is initialized to 0 in ST40 because the signal level is detected in ST42 after adding 1 to the satellite number SV in ST41, and the satellite number SV must therefore be initialized to 0 in order to start the search from satellite number 1.

If the signal level acquisition unit 52 (GPS wristwatch 10) determines operation has timed out in ST13, operation of the GPS device 40 is unconditionally aborted and reception ends (ST14).

If the GPS wristwatch 10 is located where reception is not possible, such as when it is indoors, a timeout occurs because there is no GPS satellite 15 which it can synchronize even if the GPS satellite 15 search continues. Continuing to operate the GPS device 40 will therefore needlessly consume and waste power.

Therefore, if the GPS wristwatch 10 determines in step ST13 that a GPS satellite 15 could not be detected even though operation has continued for the predetermined time, the GPS satellite 15 search (reception) ends in ST14. Wasteful consumption of power is therefore reduced.

However, if in ST42 a GPS satellite 15 with an SNR of 40 or higher is detected, the reception satellite selection unit 53 selects the detected GPS satellite 15 and determines if the signal from that GPS satellite 15 was captured (ST16).

More specifically, the reception satellite selection unit 53 uses the C/A code corresponding to the selected GPS satellite 15 to synchronize with the satellite. The reception satellite selection unit 53 determines if the satellite was captured or not based on whether the navigation message can be decoded. As described below, the navigation message is the satellite signal from the GPS satellite 15.

The reception satellite selection process executed by the reception satellite selection unit 53 is therefore rendered by the satellite capture determination step ST16.

If ST16 determines that a satellite was not captured, control goes to step ST41 and the search that was interrupted when a GPS satellite 15 with an SNR greater than or equal to 40 was detected resumes from the GPS satellite 15 of the satellite number SV scheduled to be searched for next. Steps ST16 to ST19 repeat if a GPS satellite 15 with an SNR greater than or equal to 40 is detected after the search resumes. Reception ends if the process times out after the search resumes without being able to find a GPS satellite 15 with an SNR greater than or equal to 40.

A timeout can also be set in the satellite capture determination step ST16 as in the satellite search step. In this embodiment of the invention operation times out and control returns to ST41 if satellite signal capture is not confirmed within 6 seconds after the start of the satellite capture process.

If ST16 determines that a satellite was captured, the satellite time information acquisition unit 54 determines if the Z count data was acquired (ST17).

Before describing the Z count acquisition determination step ST17, the navigation message that is the signal (satellite signal) transmitted from each GPS satellite 15 is described.

Figure 6:
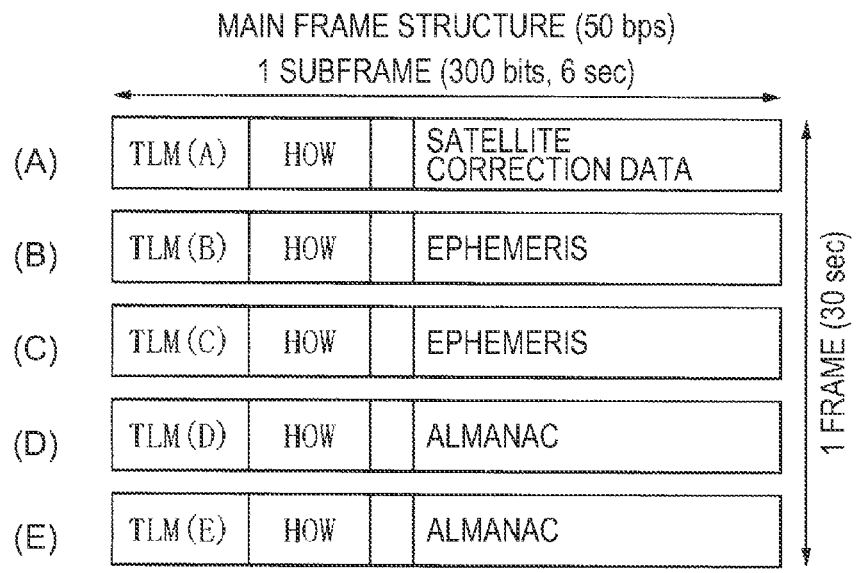
FIG. 6 schematically shows the structure of the GPS satellite signal.
Figure 7:
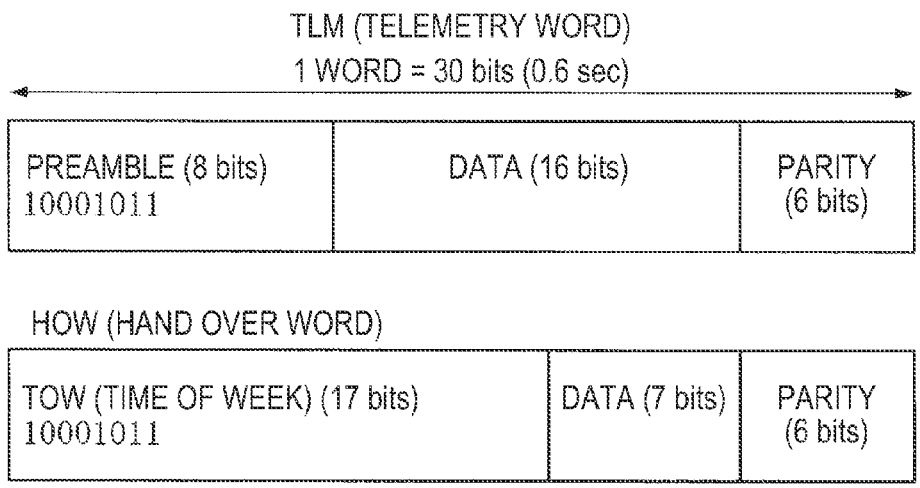
FIG. 7 schematically shows the structure of the GPS satellite signal.

FIG. 6 and FIG. 7 schematically describe the GPS signal.

As shown in FIG. 6, signals are transmitted from each of the GPS satellites 15 in units of one frame every 30 seconds. One frame contains five subframes. Each subframe is 6 seconds long, and contains 10 words (each word is 0.6 second).

The first word in each subframe is a telemetry (TLM) word storing the TLM data, and each TLM word starts with a preamble as shown in FIG. 7.

The TLM word is followed by a handover word HOW storing the HOW (handover) data, and each HOW starts with the time of week (TOW) (also called the Z count) indicating the GPS time information of the GPS satellite.

The GPS time is the number of seconds since 00:00:00 Sunday night, and is reset to zero at precisely 00:00:00 every Sunday night. The GPS time is thus information expressing the time since the start of the week in seconds, and the elapsed time is a number expressed in 1.5 second units. This GPS time is also called the Z count or the Z count data, and enables the GPS device 40 to know the current time.

The same GPS week number is added to the GPS time throughout the week, and is contained as the week number data in the navigation message or satellite signal from the GPS satellite 15.

The starting point for the GPS time information is 00:00:00 of Jan. 6, 1980 referenced to the Coordinated Universal Time (UTC), and the week that started on this day is week 0. The GPS receiver can therefore get the precise GPS time from the week number and the elapsed time (number of seconds).

The week number is updated once a week.

Once the receiver gets the week number and counts the seconds passed since the week number was acquired, the current week number of the GPS satellite 15 can be known from the acquired week number and the elapsed time without getting the week number data again. As a result, the approximate current GPS time can be known once the Z count data is acquired. Power consumption can therefore normally be reduced because the reception operation of the receiver can be completed in a short time by acquiring only the Z count data.

If for some reason the acquired week number data is deleted, the count of the time passed from when the week number was acquired is off, or a predetermined time has passed since the week number data was acquired, the week number data can be acquired again from the satellite signal received from a GPS satellite 15, and the receiver can get the current GPS time from the newly received week number data and Z count data.

As shown in FIG. 6, the main frame of the navigation message contained in the signal from the GPS satellite 15 contains 1500 bits and is transmitted at 50 bps.

The main frame is divided into five subframes of 300 bits each.

One frame is equivalent to 30 seconds. One subframe is therefore equivalent to 6 seconds. As described above, the TLM word and the Z count data (TOW) in the HOW word are contained in the first two words of each subframe. The Z count data starts from subframe 1, and six seconds of data is contained in each subframe. Subframe 1 to subframe 5 therefore contain the TLM word and the Z count (TOW) data in the HOW word. The Z count (TOW) data is therefore the time information for the next subframe. For example, the Z count data in subframe 1 is the time data for subframe 2.

As shown in FIG. 6 and FIG. 7, the navigation message carried in the satellite signal from the GPS satellite 15 includes the preamble data and the TOW in the HOW word, and the subframe data, including the ephemeris (detailed orbit information for the transmitting GPS satellite 15), almanac (orbit information for all GPS satellites 15), and the UTC data. More specifically, the subframe data of the navigation message is carried in subframe 1 to subframe 5, and the data in these five subframes render one frame data unit. The subframe data is divided into words 1 to 10.

Because the signals described above are transmitted from the GPS satellites 15, GPS signal reception as used herein unit phase synchronization with the C/A code from the GPS satellite 15.

More specifically, the GPS device 40 that is the receiver must synchronize with the signal from the GPS satellite 15 in order to get the frame data from a particular GPS satellite 15.

The C/A code is used for synchronization with 1 ms precision, and is a 1023-chip pseudo random noise code that repeats every 1 ms. The C/A code (1023 chip (1 ms) code) is different for each of the plural GPS satellites 15, and is unique to a particular satellite.

Therefore, to receive the satellite signal from a particular GPS satellite 15, the GPS device 40 (reception unit) generates the unique C/A code for a particular GPS satellite 15 and phase synchronizes with the C/A code from the selected GPS satellite 15 to receive the satellite signal.

By synchronizing with the C/A code (1023 chips (1 ms)), the preamble of the TLM word and the HOW word of each subframe can be received, and the Z count data can be acquired from the HOW word. After acquiring the TLM word and the Z count (TOW) from the HOW word, the GPS device 40 can then acquire the week number (WN) data and the satellite health SVhealth data.

Whether the acquired Z count data can be trusted can be determined with a parity check. More specifically, the parity data following the TOW data in the HOW word can be used to verify if the received data is correct. If an error is detected from the parity data, there is something wrong with the Z count data and the Z count data is not used to correct the internal clock.

The frame data shown in FIG. 6 is thus an example of information carried in frame units, and the subframe data is an example of information carried in subframe units, and both are examples of a specific unit of the satellite signal. The Z count (TOW) data is an example of satellite time information from a positioning information satellite (GPS satellite 15). The week number (WN) data is an example of week number information, which is the number of weeks from the origin of the satellite time information. The Z count data, week number (WN) data, TLM word, and HOW word are examples of satellite signal information. The satellite health SVhealth data is an example of positioning information satellite health information describing the operating condition of the positioning information satellite.

The navigation message that is the satellite signal transmitted from the GPS satellite 15 is as described above.

If a satellite is captured in step ST16, control goes to step ST17. In step ST17 the satellite time information acquisition unit 54 determines if the Z count data was acquired.

More specifically, the satellite time information acquisition unit 54 gets the Z count (TOW) data, which is an example of the satellite time information, from the navigation message that is the satellite signal from a GPS satellite 15. The satellite time information acquisition unit 54 then outputs the acquired Z count data to the control unit 20, and the control unit 20 stores this Z count data as the received satellite time information in the storage unit 20A.

More specifically, acquiring the Z count data unit that the Z count (TOW) data can be acquired after synchronizing with the preamble of the TLM word as described above.

The satellite time information acquisition unit 54 determines if the received satellite time information that is the acquired Z count (TOW) data can be trusted. More specifically, if an error in the Z count data is detected by the parity check executed by the satellite time information acquisition unit 54, there is some sort of problem with the acquired Z count data and the Z count data is therefore not used to correct the internal clock. As a result, if an error is detected in the Z count data, the GPS wristwatch 10 determines that the Z count data could not be acquired and control returns to step ST41.

A timeout can also be set in the Z count acquisition determination step ST17 as in the satellite search step described above. If the Z count data signal cannot be confirmed even though 6 seconds have passed since the start of the Z count acquisition process, this embodiment of the invention determines a timeout has occurred and returns to ST41.

The satellite time information acquisition process executed by the satellite time information acquisition unit 54 is thus achieved by the Z count acquisition determination step ST17.

If the GPS wristwatch 10 confirms in ST17 that the Z count data, that is, the satellite time information, was acquired, control goes to step ST18, reception by the GPS device 40 stops, and receiving satellite signals from the GPS satellite 15 stops.

The GPS wristwatch 10 then goes to ST19 and executes a time information adjustment step. In the time information adjustment step ST19 the control unit 20 adjusts the internal time data based on the received time data (the satellite time information). When the internal time data is adjusted, the control unit 20 then adjusts the time displayed by the display 14 and the dial 12 and hands 13 of the GPS wristwatch 10 based on the internal time data.

The GPS wristwatch 10 according to this embodiment of the invention adjusts the time as described above.

This embodiment of the invention has the following effect.

(1) When receiving a GPS signal to adjust the time, the signal level acquisition unit 52 of the GPS wristwatch 10 searches for a GPS satellite 15 and acquires the signal level of the satellite signal. While sequentially searching for a GPS satellite 15, the search is interrupted if a GPS satellite 15 with an SNR greater than or equal to 40 is found, and the Z count data is acquired.

The likelihood of being able to shorten the search time compared with searching for all GPS satellites 15 is therefore high, the time required to complete the time adjustment process can therefore be shortened, and power can be saved.

(2) Because the Z count data is acquired only if a GPS satellite 15 from which a relatively strong signal having an SNR greater than or equal to 40 is detected, the likelihood of being able to acquire the Z count is high, the time required to complete the time adjustment process can therefore be shortened accordingly, and power can be saved. The satellite capture process and Z count acquisition process can also be completed in a short time, accurate satellite time information can be quickly acquired, and the internal time can be adjusted. As a result, satellite signals can be received from a GPS satellite 15 from which reception is easy at the time, and the time can be adjusted to the correct time, even when the GPS wristwatch 10 is worn on the wrist and the user is moving around.

(3) The signal level acquisition unit 52 only needs to acquire the SNR of the satellite signal when searching for a GPS satellite 15, and can therefore acquire the signal level in less time than if the Z count is acquired. The process can therefore be completed in approximately 2 seconds even if the signal level is determined by searching for all of the approximately 30 GPS satellites 15, the GPS satellite 15 detection process therefore ends quickly, and power consumption can be reduced.

(4) Furthermore, because the signal level acquisition unit 52 terminates reception if a timeout occurs during the satellite search, the reception process can be prevented from continuing needlessly when indoors or underground where the GPS satellite 15 signal cannot be received, and power consumption can be reduced.

(5) Furthermore, because a timeout is detected in the satellite capture determination step ST16 and the Z count acquisition determination step ST17, the satellite search can be repeated to find a satellite signal with a high signal level and the time information can be acquired in a short time if the data cannot be initially received. More specifically, when the GPS wristwatch 10 is worn on the wrist and the user is walking around, nearby homes and buildings can easily interrupt signal reception. As a result, even if a GPS satellite 15 from which a strong signal can be received is found, reception may be interrupted while the user is moving. This embodiment of the invention recognizes that reception has timed out in this situation and can quickly detect that the satellite signal was interrupted. By then again searching for a satellite and receiving the signal from the best available satellite at that time, the time information can be acquired in a short time.

Furthermore, because the timeout period is set to 6 seconds in the satellite capture determination step ST16 and the Z count acquisition determination step ST17, the signal interruption can be efficiently detected and the next satellite search can be quickly initiated. More specifically, the Z count data is carried in each 6-second subframe of the GPS signal, and the Z count data is therefore transmitted every 6 seconds. Therefore, the GPS satellite 15 is known to be currently unsuitable for signal reception if the signal cannot be confirmed within 6 seconds, and if the next satellite search then starts immediately, a GPS satellite 15 suitable for reception can be found efficiently.

(6) This embodiment of the invention improves the likelihood of being able to acquire the satellite time information because it selects a GPS satellite 15 with an SNR greater than or equal to 40 from which to receive the satellite signal.

More specifically, if the elevation angle of the GPS satellite 15 is high, the likelihood is low that the satellite signals transmitted from the satellite will be blocked by a building. That is, because the signal level is better and the SNR is higher the closer the GPS satellite 15 is to the zenith (directly overhead at a high elevation angle), the possibility of being able to acquire the satellite time information is improved by selecting a GPS satellite 15 with an SNR greater than or equal to 40.

In addition, if the GPS satellite 15 is subject to multipath interference caused by buildings reflecting the signals, the SNR will be low and the possibility of acquiring the time information from that satellite will be low. By selecting a satellite with a high SNR at that time, however, the likelihood of being able to acquire the satellite time information can be improved.

Embodiment 2

A second embodiment of the invention is described next. In this second and further embodiments described below, parts that are substantially identical to parts in other embodiments are identified by the same reference numerals and further description thereof is omitted.

This second embodiment of the invention uses a multi-channel reception circuit reception circuit 18. While searching for a GPS satellite 15 in the satellite search process, GPS satellites 15 with a signal level greater than or equal to a first level are assigned to different reception channels and the search is interrupted when GPS satellites 15 have been assigned to all channels. The satellite search is also interrupted if a GPS satellite 15 with a signal level greater than or equal to a second level that is higher than the first level is detected before GPS satellites 15 have been assigned to all channels.

Figure 8:
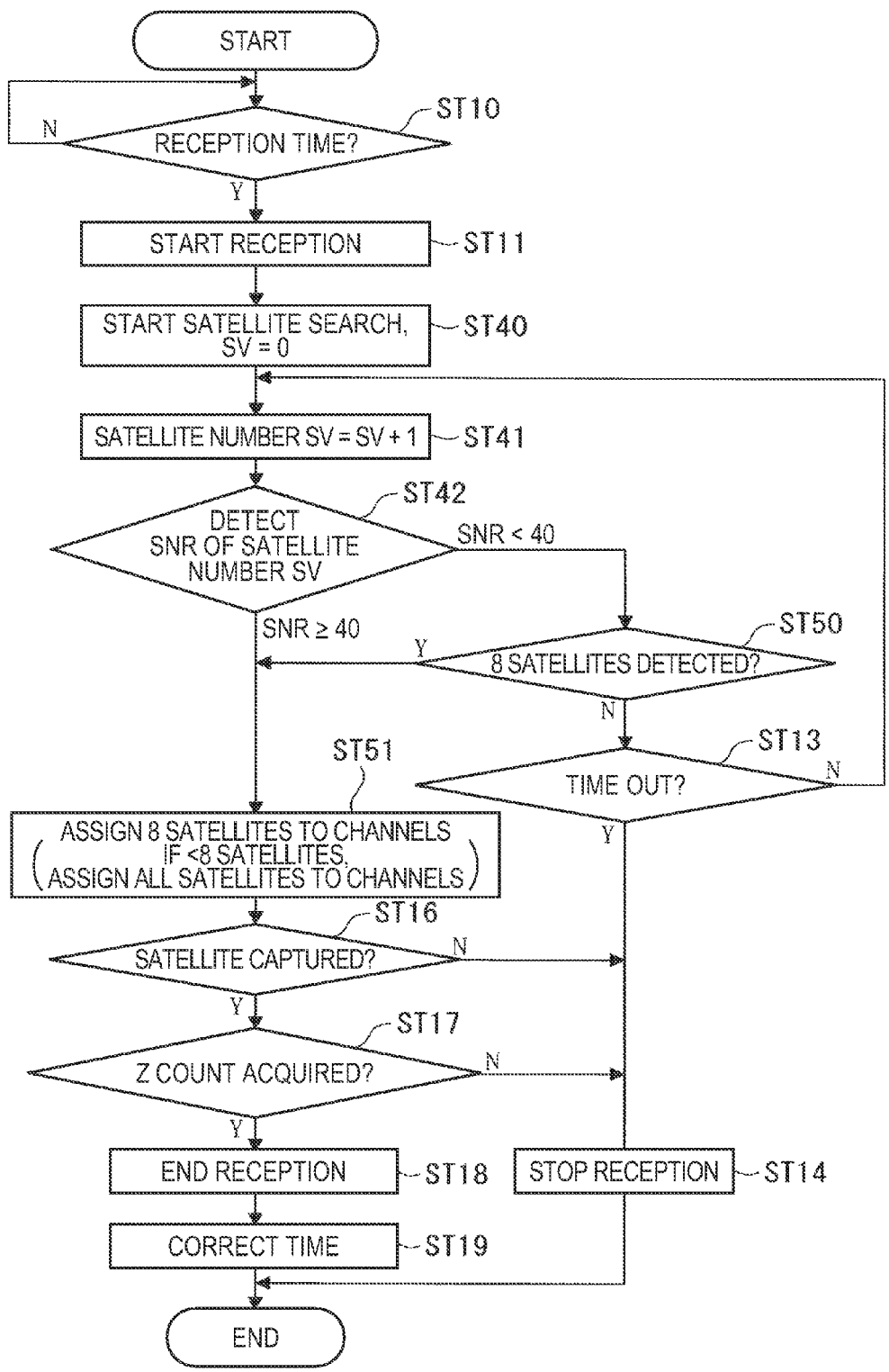
FIG. 8 is a flow chart showing the time adjustment operation of the second embodiment of the invention.

The operating method of this second embodiment of the invention is described below with reference to the flow chart in FIG. 8. Note that steps that perform the same process as shown in the flow chart of the first embodiment in FIG. 5 are identified by the same reference numerals, and further description thereof is omitted.

The signal level acquisition unit 52 of the GPS wristwatch 10 references the internal time information to determine if the preset reception time has come (ST10), and starts reception if the reception time has come (ST11).

The signal level acquisition unit 52 then runs a satellite search step to detect the signal level. In the satellite search step the signal level acquisition unit 52 initializes the satellite number SV to 0 (ST40), and then adds 1 to the satellite number SV (ST41).

The signal level acquisition unit 52 then detects the signal level (SNR) of the GPS satellite 15 identified by the satellite number SV (ST42).

If the SNR is less than 40 in ST42, the signal level acquisition unit 52 confirms if eight GPS satellites 15 have been detected (ST50).

As used here, detecting a GPS satellite 15 means that the SNR of the GPS satellite 15 is at least a first threshold level, such as an SNR greater than or equal to 35. This is because the satellite signal cannot be captured if the SNR is less than this first threshold level, and even if the signal can be captured, the likelihood is high that the Z count data cannot be acquired and there is therefore no need to execute the reception process.

If eight GPS satellites 15 have not been detected (ST50 returns No), the signal level acquisition unit 52 determines if the search has timed out by determining if the time passed since the start of the satellite search exceeds a predetermined time (such as 6 seconds) (ST13).

If operation has not timed out in ST13, the signal level acquisition unit 52 returns to step ST41 and adds 1 to the satellite number SV, and then detects the signal level of the GPS satellite 15 identified by the new satellite number SV (ST42).

If in ST42 a GPS satellite 15 with an SNR greater than or equal to a second threshold level (40 in this embodiment) is detected, or if a GPS satellite 15 with an SNR greater than or equal to the second level is not found but step ST50 confirms that eight GPS satellites 15 have been detected, the detected satellites are assigned to the reception channels (ST51).

For example, if the reception circuit 18 has eight reception channels and the SNR of the GPS satellite 15 identified by the first satellite number SV=1 detected is greater than or equal to the second threshold level, only that GPS satellite 15 is assigned to a reception channel.

If eight satellites with an SNR less than the second level and greater than or equal to the first threshold level are detected before a GPS satellite 15 with an SNR greater than or equal to the second level is detected, those eight GPS satellites 15 are assigned to the reception channels.

The reception satellite selection unit 53 then determines if the signals from the GPS satellites 15 set to each of the reception channels were captured (ST16). This satellite capture determination step ST16 is applied in parallel to each of the reception channels.

If a satellite is captured on any of the reception channels in ST16, the satellite time information acquisition unit 54 determines if the Z count data was acquired (ST17). This Z count acquisition determination step ST17 is also applied in parallel to all of the reception channels.

If ST17 determines that the satellite time information was acquired, the GPS wristwatch 10 terminates reception (ST18), and the time adjustment device 44 then adjusts the internal time information based on the received satellite time information (ST19).

If ST17 determines that the Z count data (satellite time information) was acquired on plural reception channels, the time adjustment device 44 compares the multiple acquired Z counts, determines if the data is valid, and adjusts the internal time information if the time information is determined to be correct.

The GPS wristwatch 10 terminates reception (ST14) if operation times out (ST13 returns Yes), if a satellite was not captured on any of the reception channels (ST16 returns No), or if the Z count data could not be acquired on any of the reception channels (ST17 returns No).

This second embodiment also has the following effect in addition to the effects (1) to (6) of the preceding embodiment described above.

(2-1) The satellite search stops and the Z count data is acquired if a GPS satellite 15 with a signal level greater than or equal to a second threshold level is found while sequentially searching for the GPS satellites 15.

The likelihood of being able to shorten the search time compared with searching for all GPS satellites 15 is therefore high, the time required to complete the time adjustment process can therefore be shortened, and power can be saved.

(2-2) If a GPS satellite 15 with a signal level greater than or equal to a second threshold level cannot be detected, the satellite capture determination step ST16 and the Z count acquisition determination step ST17 are applied simultaneously to the plural reception channels when eight GPS satellites 15 with a signal level greater than or equal to the first threshold level have been detected. The likelihood that the correct satellite time information can be acquired from among the plural GPS satellites 15 is therefore increased even if the signal level is less than the second level, and precise satellite time information can therefore be acquired.

In addition, because the satellite time information of plural satellites is acquired, the satellite time information can be compared to determine if the data is correct, and precise satellite time information can therefore be acquired.

(2-3) Furthermore, GPS satellites 15 with a signal level greater than or equal to the second level and GPS satellites 15 with a signal level less than the second level and greater than or equal to the first level can be assigned to plural channels for processing, the satellite time information from each of the satellites can be compared, whether correct data was acquired can be determined, and highly precise satellite time information can be acquired.

This embodiment of the invention may therefore run the reception process using only a GPS satellite 15 with an extremely high signal level, or it may run the reception process using a plurality of GPS satellites 15 with an acceptably high signal level. The plural reception channels can therefore be efficiently used to complete the time adjustment process in a relatively short time and save power while increasing the precision of the acquired time.

Embodiment 3

A third embodiment of the invention is described next.

The GPS wristwatch 10 according to the first embodiment interrupts searching and acquires the satellite time information when a satellite from which signals with a signal level greater than or equal to a prescribed level is detected during the satellite search process.

The GPS wristwatch 10 according to this third embodiment of the invention searches for all GPS satellites 15, selects the satellite with the highest signal level (specifically, the highest SNR), and then executes the satellite capture step. This embodiment thus differs from the first embodiment in that the search is not interrupted.

Figure 9:
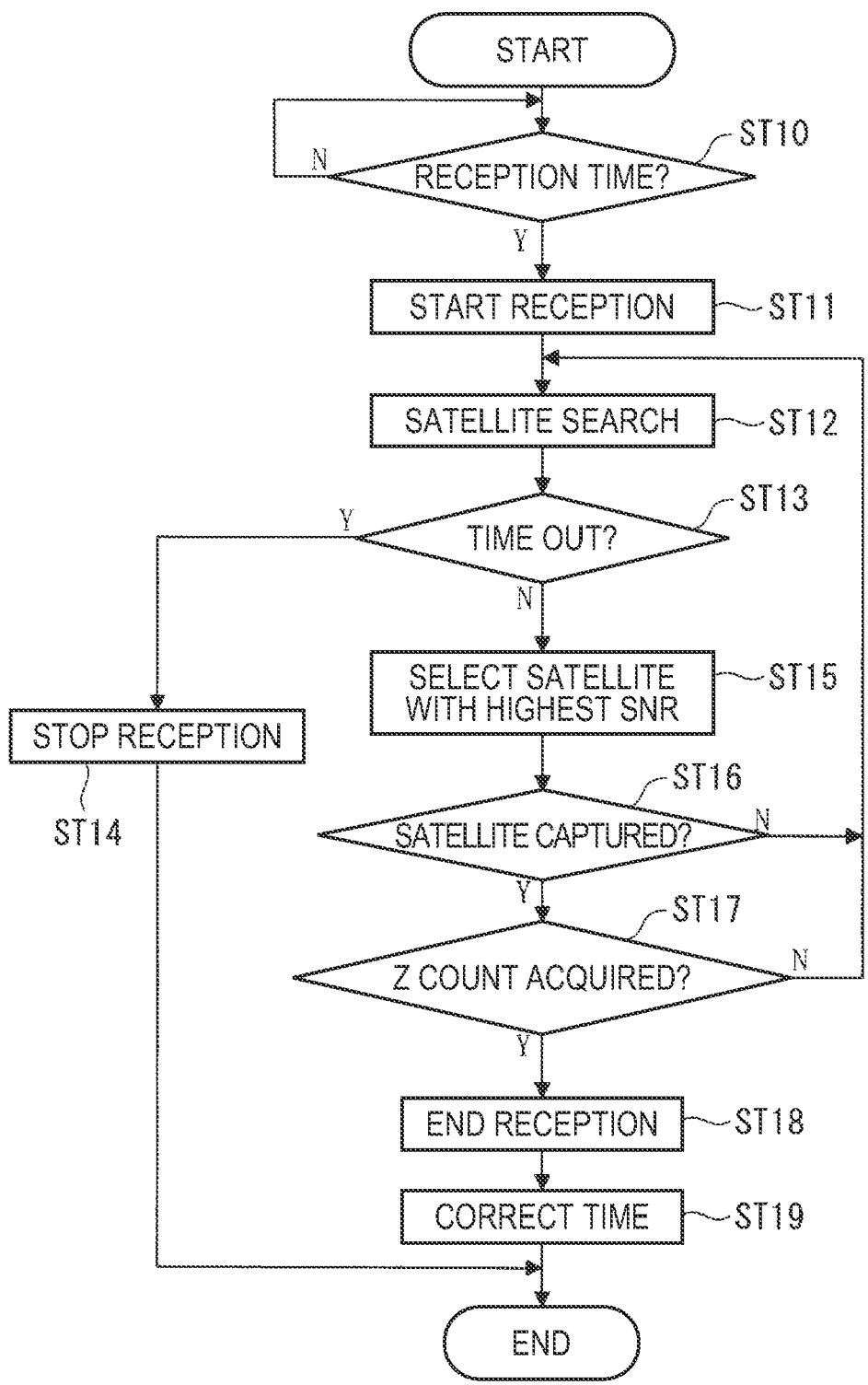
FIG. 9 is a flow chart showing the time adjustment operation of the third embodiment of the invention.

The operating method of this third embodiment of the invention is described below with reference to the flow chart in FIG. 9. Note that steps that perform the same process as shown in the flow chart of the first embodiment in FIG. 5 are identified by the same reference numerals, and further description thereof is omitted.

The signal level acquisition unit 52 of the GPS wristwatch 10 references the internal time information to determine if the preset reception time has come (ST10), and starts reception if the reception time has come (ST11).

The signal level acquisition unit 52 then runs the satellite search step ST12 to detect the signal level. This step searches (synchronizes) sequentially from satellite number 1, and stores information (such as the satellite number) about the GPS satellite 15 detected by the search and the signal level of that satellite in a storage unit such as SRAM 37.

Note that the code length of the C/A code is 1 ms, and a search for all approximately 30 GPS satellites 15 can be conducted in approximately 2 seconds by adjusting the C/A code output time while searching.

The signal level acquisition unit 52 then determines if the satellite search process has timed out (ST13).

As described above, the GPS satellite 15 search can be completed within a maximum 2 seconds if a satellite can be detected. Therefore, if synchronization with a GPS satellite 15 is not successful within a predetermined time, such as 6 seconds, after the satellite search step ST12 starts, the signal level acquisition unit 52 determines that the search has timed out.

The signal level acquisition process run by the signal level acquisition unit 52 is thus rendered by the reception starting step ST11, the satellite search step ST12, and the timeout determination step ST13.

If ST13 determines a timeout has occurred, the GPS wristwatch 10 unconditionally ends operation of the GPS device 40 and aborts reception (ST14).

However, if a timeout is not confirmed in ST13 because a GPS satellite 15 was detected, the reception satellite selection unit 53 of the GPS wristwatch 10 selects a GPS satellite 15 (ST15).

More specifically, the reception satellite selection unit 53 selects the GPS satellite 15 to be captured based on the signal level acquired by the signal level acquisition unit 52. This embodiment selects the GPS satellite 15 with the highest signal level (SNR) if the signal level acquisition unit 52 detects (synchronizes with) a plurality of GPS satellites 15.

The reception satellite selection unit 53 then determines if the selected GPS satellite 15 can be captured (ST16).

More specifically, the reception satellite selection unit 53 uses the C/A code corresponding to the selected GPS satellite 15 to synchronize with the satellite. The reception satellite selection unit 53 determines if the satellite was captured or not based on whether the navigation message can be decoded. As described above, the navigation message is the satellite signal from the GPS satellite 15.

The reception satellite selection process executed by the reception satellite selection unit 53 is therefore rendered by the highest-signal-level satellite selection step ST15 and the satellite capture determination step ST16.

If ST16 determines that a satellite was captured, the satellite time information acquisition unit 54 determines if the Z count data (satellite time information) was acquired (ST17).

If the Z count data (satellite time information) was acquired, the GPS wristwatch 10 stops reception (ST18), and the time adjustment device 44 corrects the internal time information based on the received satellite time information (ST19).

If the satellite could not be captured (ST16 returns No), or if the Z count data could not be acquired (ST17 returns No), the GPS wristwatch 10 returns to ST12 and the signal level acquisition unit 52 searches again for a GPS satellite 15 to capture a different GPS satellite 15.

A timeout can also be set in the satellite capture determination step ST16 as in the satellite search step. In this embodiment of the invention operation times out and control returns to ST12 if satellite signal capture is not confirmed within 6 seconds after the start of the satellite capture process.

A timeout can also be set in the Z count acquisition determination step ST17 as in the satellite search step described above. If the Z count data signal cannot be confirmed even though 6 seconds have passed since the start of the Z count acquisition process, this embodiment of the invention determines a timeout has occurred and returns to ST12.

The satellite time information acquisition process executed by the satellite time information acquisition unit 54 is thus achieved by the Z count acquisition determination step ST17.

This third embodiment also has the following effect in addition to the effects (3) to (6) of the first embodiment described above.

(3-1) When the GPS wristwatch 10 receives a GPS signal to adjust the time, the signal level acquisition unit 52 searches for a GPS satellite 15 and determines the signal level of each satellite signal. The reception satellite selection unit 53 then selects the GPS satellite 15 with the highest signal level, and the satellite time information acquisition unit 54 receives the satellite signal and the satellite time information (Z count data) from the selected GPS satellite 15.

Therefore, because the GPS wristwatch 10 synchronizes with and receives the satellite signal from the GPS satellite 15 with the strongest signal when receiving the satellite signals, the satellite capture process and the Z count acquisition process can be completed in a short time, accurate satellite time information can be acquired quickly, and the internal time can be adjusted. As a result, the satellite signal can be received from the GPS satellite 15 from which signals can be received most easily at the present time and the correct time can be set even when the GPS wristwatch 10 is worn on the wrist and the user is moving around.

Embodiment 4

A fourth embodiment of the invention is described next.

In the third embodiment described above the GPS wristwatch 10 selects the satellite with the highest signal level (specifically the SNR) from among the GPS satellites 15 found by the satellite search process ST12, and then runs the satellite capture process. If the satellite capture determination process ST16 determines that the satellite cannot be captured, the GPS wristwatch 10 returns to the satellite search process ST12 and searches for a different satellite.

This fourth embodiment differs from the third embodiment in that the GPS wristwatch 10 stores the SNR of each GPS satellite 15 found by the satellite search process ST12, and attempts to capture a satellite in descending order from the highest SNR until a satellite is captured.

Figure 10:
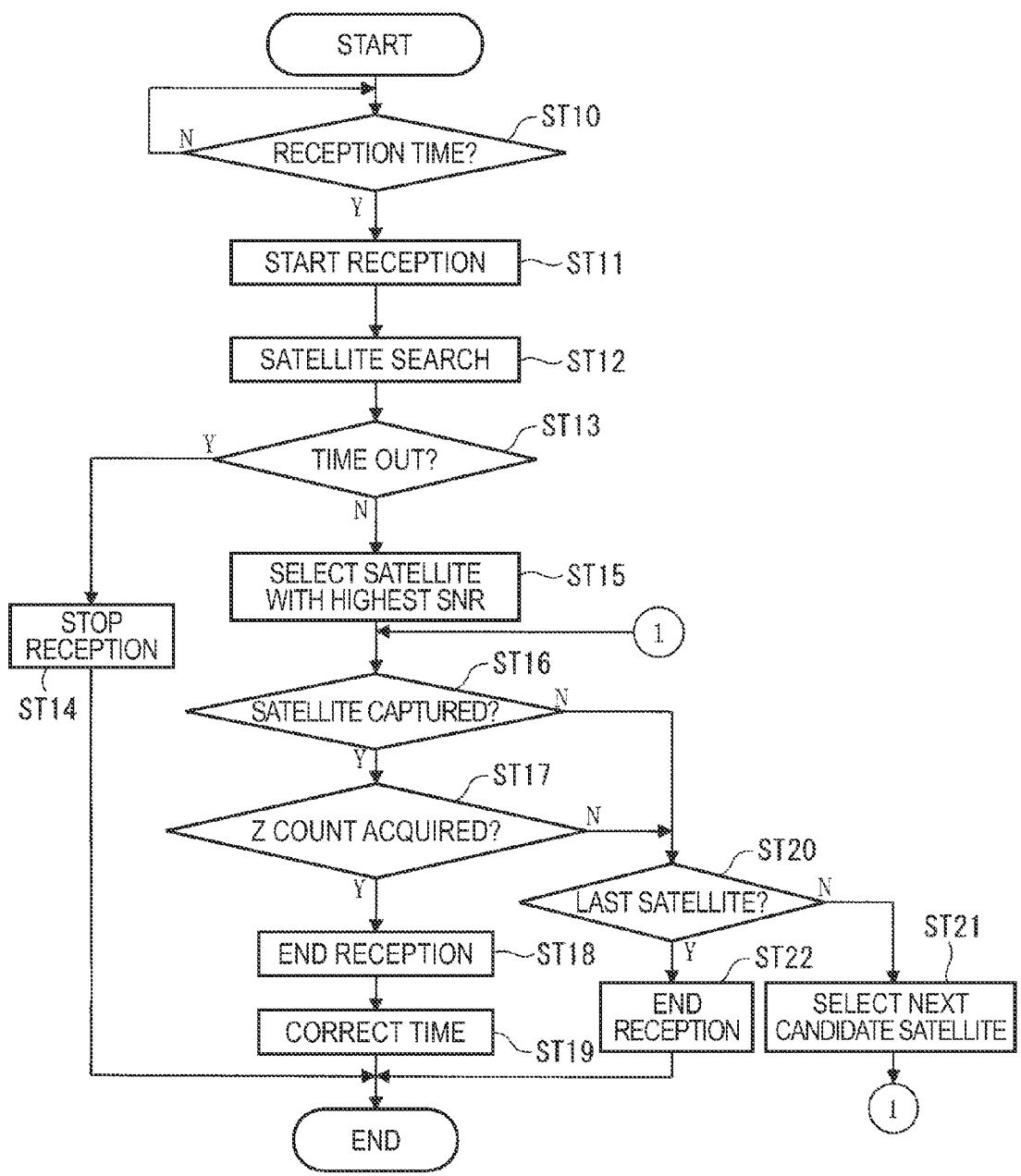
FIG. 10 is a flow chart showing the time adjustment operation of the fourth embodiment of the invention.

The operating method of this fourth embodiment of the invention is described below with reference to the flow chart in FIG. 10. Note that steps that perform the same process as shown in the flow charts of the first and third embodiments in FIG. 5 and FIG. 9 are identified by the same reference numerals, and further description thereof is omitted.

The signal level acquisition unit 52 of the GPS wristwatch 10 references the internal time information to determine if the preset reception time has come (ST10), and starts reception if the reception time has come (ST11).

The signal level acquisition unit 52 then runs the satellite search step ST12 and detects the signal level. In this case the signal level acquisition unit 52 acquires a number identifying each GPS satellite 15 (the satellite number) and the signal level (signal strength; SNR) of the satellite, and sets the selection order sequentially from the highest signal level as shown in Table 1. For example, because signals cannot be received from GPS satellites 15 that are on the opposite side of the Earth, GPS satellites 15 with a signal level near zero can be omitted from the group of selected satellites.

TABLE 1

| Selection sequence | Satellite number | Signal strength (SNR) |
| --- | --- | --- |
| 1 | 14 | 47 |
| 2 | 1 | 45 |
| 3 | 31 | 43 |
| 4 | 6 | 40 |
| 5 | 7 | 39 |
| 6 | 16 | 37 |
| 7 | 21 | 35 |
| 8 | 24 | 30 |

The signal level acquisition unit 52 then determines if the satellite search process has timed out (ST13).

If ST13 determines a timeout has occurred, the GPS wristwatch 10 ends reception (ST14).

However, if a timeout is not confirmed in ST13, the reception satellite selection unit 53 selects the GPS satellite 15 with the highest signal level (SNR) from among the detected GPS satellites 15 (ST15), and determines if the selected GPS satellite 15 can be captured (ST16).

If ST16 determines that a satellite was captured, the satellite time information acquisition unit 54 determines if the Z count data (satellite time information) was acquired (ST17).

If the Z count data (satellite time information) was acquired, the GPS wristwatch 10 stops reception (ST18), and the time adjustment device 44 corrects the internal time information based on the received satellite time information (ST19).

If the satellite could not be captured (ST16 returns No), or if the Z count data could not be acquired (ST17 returns No), the reception satellite selection unit 53 determines if the currently selected satellite is the last satellite in the group of selectable satellites (ST20).

If the reception satellite selection unit 53 determines in ST20 that the selected satellite is not the last satellite in the group, the reception satellite selection unit 53 selects the next candidate satellite (ST21). As shown in Table 1, the reception satellite selection unit 53 in this embodiment of the invention selects the GPS satellites 15 in descending order of the signal strength acquired in the satellite search process ST12.

Control then returns to ST16, and steps ST16, ST17, ST20, and ST21 repeat until the Z count data is acquired in ST17.

If step ST20 determines that the last satellite was selected, there are no more candidate satellites, and reception therefore ends (ST22).

This fourth embodiment also has the following effect in addition to the effects (3) to (6) and (3-1) of the embodiments described above.

(4-1) If the Z count data cannot be acquired even though the satellite with the highest signal level is selected, the next candidate satellite is selected without repeating the satellite search process ST12. Compared with the first embodiment in which the satellite search process ST12 is repeated, the time required to acquire the Z count data can therefore be shortened.

Because a plurality of GPS satellites 15 can normally be acquired, the possibility is high that another satellite can be captured even if the satellite with the strongest signal level cannot be captured. A satellite can therefore be captured and the Z count data can be acquired in less time by selecting the next candidate satellite than by searching for a satellite again.

(4-2) In addition, because the satellites are selected in order of the highest signal strength in ST21, this embodiment of the invention can quickly select a satellite from which the Z count data can be acquired, and can further shorten the processing time until the time can be corrected.

Embodiment 5

A fifth embodiment of the invention is described next.

The GPS wristwatch 10 according to this fifth embodiment of the invention uses a multichannel reception circuit reception circuit 18 that can receive a plurality of satellite signals. This embodiment differs from the third and fourth embodiments in that the eight GPS satellites 15 with the highest signal levels (SNR) are selected from among the GPS satellites 15 found by the satellite search process ST12, each satellite is assigned to a particular channel, and the satellite capture determination process ST16 and the Z count acquisition determination process ST17 are applied to each channel.

Figure 11:
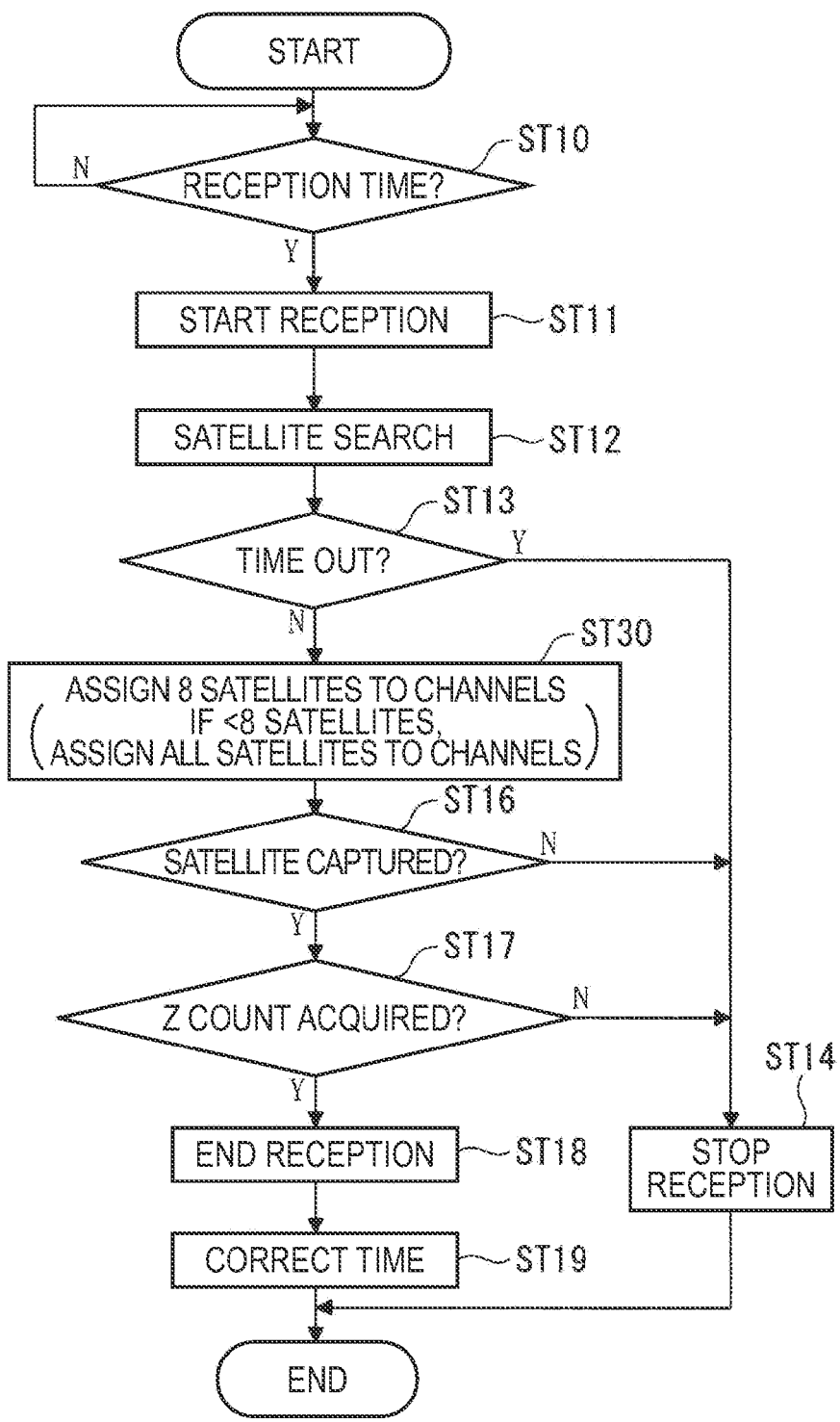
FIG. 11 is a flow chart showing the time adjustment operation of the fifth embodiment of the invention.

The operating method of this fifth embodiment of the invention is described below with reference to the flow chart in FIG. 11.

Note that steps that perform the same process as shown in the flow charts of the third and fourth embodiments are identified by the same reference numerals, and further description thereof is omitted.

The signal level acquisition unit 52 of the GPS wristwatch 10 references the internal time information to determine if the preset reception time has come (ST10), and starts reception if the reception time has come (ST11).

The signal level acquisition unit 52 then runs the satellite search step ST12 and detects the signal level. As in the fourth embodiment shown in Table 1, the signal level acquisition unit 52 acquires a number identifying each GPS satellite 15 (the satellite number) and the signal level (signal strength; SNR) of the satellite, and sets the selection order sequentially from the highest signal level. As described above, because signals cannot be received from GPS satellites 15 that are on the opposite side of the Earth, GPS satellites 15 with a signal level near zero can be omitted from the group of selected satellites.

The signal level acquisition unit 52 then determines if the satellite search process has timed out (ST13). If ST13 determines a timeout has occurred, reception ends (ST14).

However, if a timeout is not confirmed in ST13, the reception satellite selection unit 53 selects and assigns the detected GPS satellites 15 to the reception channels in order from the GPS satellite 15 with the highest signal level (SNR) (ST30). Because this embodiment of the invention has eight reception channels, the reception satellite selection unit 53 selects the GPS satellites 15 with the eight highest signal levels and assigns them to the reception channels.

If there are eight or fewer GPS satellites 15 in the group of selected satellites, all of the selected GPS satellites 15 are assigned to a reception channel.

It is also possible to only assign GPS satellites 15 with a signal strength greater than or equal to a predetermined level (such as an SNR of 35 or higher). In this case GPS satellites 15 with a signal strength below the predetermined level (such as an SNR less than 35) are not assigned to a reception channel.

The reception satellite selection unit 53 then determines if the GPS satellite 15 assigned to each reception channel can be captured (ST16). This satellite capture determination process ST16 is applied simultaneously to each of the reception channels.

If a satellite can be captured on any reception channel (ST16 returns Yes), the satellite time information acquisition unit 54 determines if the Z count data (satellite time information) was acquired (ST17). The Z count acquisition determination process ST17 is also applied simultaneously to each of the reception channels.

If the Z count data (satellite time information) was acquired (ST17 returns Yes), the GPS wristwatch 10 stops reception (ST18), and the time adjustment device 44 corrects the internal time information based on the received satellite time information (ST19).

If the Z count acquisition determination process ST17 acquires the Z count data (satellite time information) on plural reception channels, the time adjustment device 44 compares the satellite time information from the plural satellites, verifies if the data is valid, and corrects the internal time information if the time information is determined to be correct.

If the satellite capture determination process ST16 determines that a satellite could not be captured on any of the reception channels, or if the Z count acquisition determination process ST17 determines that the Z count data could not be acquired from any of the reception channels, the GPS wristwatch 10 ends reception (ST14).

This fifth embodiment also has the following effect in addition to the effects (3) to (6), (3-1), (4-1), and (4-2) of the embodiments described above.

(5-1) Because there are plural reception channels and the satellite capture determination process ST16 and Z count acquisition determination process ST17 are applied in parallel to each of the reception channels, processing takes less time than in the preceding embodiments that select and process the satellites one at a time. More specifically, because this embodiment of the invention simultaneously receives and processes the satellite signals from eight GPS satellites 15, the processing time can be shortened to at most ⅛ of the time required when the GPS satellites 15 are selected and processed one by one.

(5-2) Furthermore, because satellite time information can be acquired from a plurality of satellites, whether correct time information has been acquired can be confirmed by comparing the received satellite time information, and precise satellite time information can therefore be acquired. For example, if only one of the plural satellite times indicates a different time, that different time value can be determined to contain noise. The other satellite time values can therefore be assumed to be correct and used to correct the internal time information, and the time can therefore be corrected with good precision.

(5-3) When only the GPS satellites 15 with a signal level greater than or equal to a predetermined level (such as an SNR of 35 or higher) are included in the group of selectable satellites, GPS satellites 15 with a low signal level are not selected because the possibility is high that the Z count data (satellite time information) cannot be received, unnecessary reception processes are therefore eliminated, and power can be saved.

The invention is not limited to the foregoing embodiments.

For example, in each of the foregoing embodiments the signal level acquisition unit 52 searches for a GPS satellite 15, and reception ends if a timeout occurs while attempting to acquire the satellite time information or the Z count data cannot be acquired from any of the selected GPS satellites 15. Control could be applied to try acquiring the time information again, however. For example, the satellite time information cannot be acquired if the device temporarily moves indoors where the satellite signal is blocked by buildings or the roof, but the satellite time information can be acquired when the device moves away from the building. If reception ends without adjusting the time, acquiring the time information could therefore be attempted again after waiting a predetermined time.

Because the satellite time information acquisition process would usually be attempted again in such cases after waiting approximately 30 minutes to 3 hours, the information from the last time the signal level was detected is preferably used when trying to acquire the satellite time information again. For example, if the satellite time information is acquired in order of the highest SNR, the time information can be more efficiently acquired by using the previous satellite search list (the search list sorted by the highest SNR) than by repeating the satellite search.

However, if the time passed is very long, the GPS satellites 15 from which signals can be received may have changed. As a result, whether to use the previous search list or whether to repeat the satellite search is preferably determined according to the time passed since the last satellite search.

The invention is not limited to the embodiments described above. The foregoing embodiments are described with reference to a GPS satellite, but the invention is not limited to GPS satellites and can be used with Global Navigation Satellite Systems (GNSS) such as Galileo and GLONASS, and other positioning information satellites that transmit satellite signals containing time information, including the SBAS and other geostationary or quasi-zenith satellites.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A time adjustment device comprising:
    a reception unit having a plurality of reception channels that receive and process satellite signals containing satellite time information measured by positioning information satellites;
    a time information generating unit that generates internal time information;
    a time information adjustment unit that adjusts the internal time information;
    a signal level acquisition unit that detects the signal level of each received satellite signal, wherein, if the detected signal level of a satellite signal is at or above a second level, the signal level acquisition unit discontinues its detection operation and allocates the corresponding positioning information satellite to one of the plurality of reception channels, if the detected signal level of a satellite signal is below the second level and at or above a first level, lower than the second level, the signal level acquisition unit allocates the corresponding positioning information satellite to one of the plurality of reception channels and continues its detection operation until a satellite signal at or above the second level is detected;
    a reception satellite selection unit that selects a positioning information satellite based on the detected signal levels of the positioning information satellites;
    a satellite time information acquisition unit that receives the satellite signal transmitted from the positioning information satellite selected by the reception satellite selection unit, and acquires the corresponding satellite time information;
    wherein the time information adjustment unit adjusts the internal time information based on the satellite time information acquired by the satellite time information acquisition unit.

2. The time adjustment device described in claim 1, wherein:
    the reception unit has a storage unit for storing information regarding the identity of a particular positioning information satellite and signal level detected by the signal level acquisition unit.

3. The time adjustment device described in claim 1, wherein:
    the reception satellite selection unit selects the positioning information satellite from which the highest signal level was detected by the signal level acquisition unit.

4. The time adjustment device described in claim 1, wherein:
    the reception satellite selection unit sets the positioning information satellite selection sequence in order from the highest signal level detected by the signal level acquisition unit, and selects the positioning information satellites in the set order when the satellite time information acquisition unit cannot acquire the satellite time information.

5. The time adjustment device described in claim 1, wherein:
    the reception satellite selection unit selects the positioning information satellites in order from the highest signal level detected by the signal level acquisition; and
    the satellite time information acquisition unit assigns the selected positioning information satellites to the reception channels in order from the highest signal level, receives a satellite signal on each channel, and acquires the satellite time information contained in each satellite signal.

6. The time adjustment device described in claim 1, wherein:
the satellite time information acquisition unit receives satellite time information on each channel to which a positioning information satellite is assigned, compares the received satellite time information, and determines if the received satellite time information is correct; and
the time information adjustment unit adjusts the internal time information based on the acquired satellite time information if the satellite time information acquisition unit determines that the time information is correct.

7. The time adjustment device described in claim 1, wherein:
the satellite time information acquisition unit determines that the satellite time information cannot be acquired if the satellite time information could not be acquired within a predetermined time from the start of receiving the satellite signal from the selected positioning information satellite.

8. A timepiece with a time adjustment device, comprising:
a reception unit having a plurality of reception channels that receive and process satellite signals containing satellite time information measured by positioning information satellites;
a time information generating unit that generates internal time information;
a time information adjustment unit that adjusts the internal time information; and
a time display unit that displays the internal time information;
a signal level acquisition unit that detects the signal level of each received satellite signal, wherein, if the detected signal level of a satellite signal is at or above a second level, the signal level acquisition unit discontinues its detection operation and allocates the corresponding positioning information satellite to one of the plurality of reception channels, if the detected signal level of a satellite signal is below the second level and at or above a first level, lower than the second level, the signal level acquisition unit allocates the corresponding positioning information satellite to one of the plurality of reception channels and continues its detection operation until a satellite signal at or above the second level is detected;
a reception satellite selection unit that selects a positioning information satellite based on the detected signal levels of the positioning information satellites;
a satellite time information acquisition unit that receives the satellite signal transmitted from the positioning information satellite selected by the reception satellite selection unit, and acquires the corresponding satellite time information;
wherein the time information adjustment unit adjusts the internal time information based on the satellite time information acquired by the satellite time information acquisition unit.

9. A time adjustment method comprising:
generating internal time information;
detecting the signal level of each received satellite signal transmitted from respective positioning information satellites, wherein, if the detected signal level of a satellite signal is at or above a second level, discontinuing the detecting operation and allocating the corresponding positioning information satellite to one of the plurality of reception channels, if the detected signal level of a satellite signal is below the second level and at or above a first level, lower than the second level, allocating the corresponding positioning information satellite to one of the plurality of reception channels and continuing the detecting operation until a satellite signal at or above the second level is detected;
selecting a positioning information satellite based on the detected signal levels of the positioning information satellites;
receiving the satellite signal transmitted from the positioning information satellite selected in the selecting step, and acquiring the satellite time information that is contained in the satellite signal and kept by the selected positioning information satellite; and
adjusting the internal time information based on the acquired satellite time information.

* * * * *